US012566734B2

(12) United States Patent　　(10) Patent No.:　US 12,566,734 B2
Li　　(45) Date of Patent:　Mar. 3, 2026

(54) FILE CONNECTION METHOD AND APPARATUS, TERMINAL DEVICE, AND STORAGE MEDIUM

(71) Applicant: HUAWEI TECHNOLOGIES CO., LTD., Shenzhen (CN)

(72) Inventor: Haoran Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 105 days.

(21) Appl. No.: 18/264,867

(22) PCT Filed: Jan. 4, 2022

(86) PCT No.: PCT/CN2022/070080
　§ 371 (c)(1),
　(2) Date: Aug. 9, 2023

(87) PCT Pub. No.: WO2022/170891
　PCT Pub. Date: Aug. 18, 2022

(65) Prior Publication Data
　US 2024/0104058 A1　Mar. 28, 2024

(30) Foreign Application Priority Data
　Feb. 10, 2021　(CN) ......................... 202110185209.X

(51) Int. Cl.
　*G06F 16/16*　　(2019.01)
　*G06F 16/172*　　(2019.01)
　*G06F 16/176*　　(2019.01)
　*G06F 16/178*　　(2019.01)

(52) U.S. Cl.
　CPC .......... *G06F 16/176* (2019.01); *G06F 16/164* (2019.01); *G06F 16/172* (2019.01); *G06F 16/178* (2019.01)

(58) Field of Classification Search
　CPC ..... G06F 16/164; G06F 16/172; G06F 16/176
　See application file for complete search history.

(56) References Cited

U.S. PATENT DOCUMENTS

2015/0100993 A1* 4/2015 Lee ...................... H04N 21/435
　　　　　　　　　　　　　　　　　 725/90
2015/0271573 A1　9/2015 Liang et al.
2017/0322933 A1* 11/2017 Rosenblatt ............ G06F 16/178

FOREIGN PATENT DOCUMENTS

CN　　103944709 A　　7/2014
CN　　110336871 A　* 10/2019

* cited by examiner

*Primary Examiner* — Grace Park

(57) ABSTRACT

A file connection method and apparatus, terminal device, and storage medium are provided. The file connection method is applied to a file system. The file system includes a plurality of devices. Metadata of a target file is separately stored in metabases of the plurality of devices. The method includes: A current device determines a device that accesses the target file last time, a device in which the file is located, and a connection record based on the stored metadata of the target file, and the current device obtains file data of the target file from at least one of the device that accesses the target file last time and the device in which the file is located; and the current device displays to-be-displayed content based on at least one of the connection record of the target file and the file data of the target file.

19 Claims, 26 Drawing Sheets

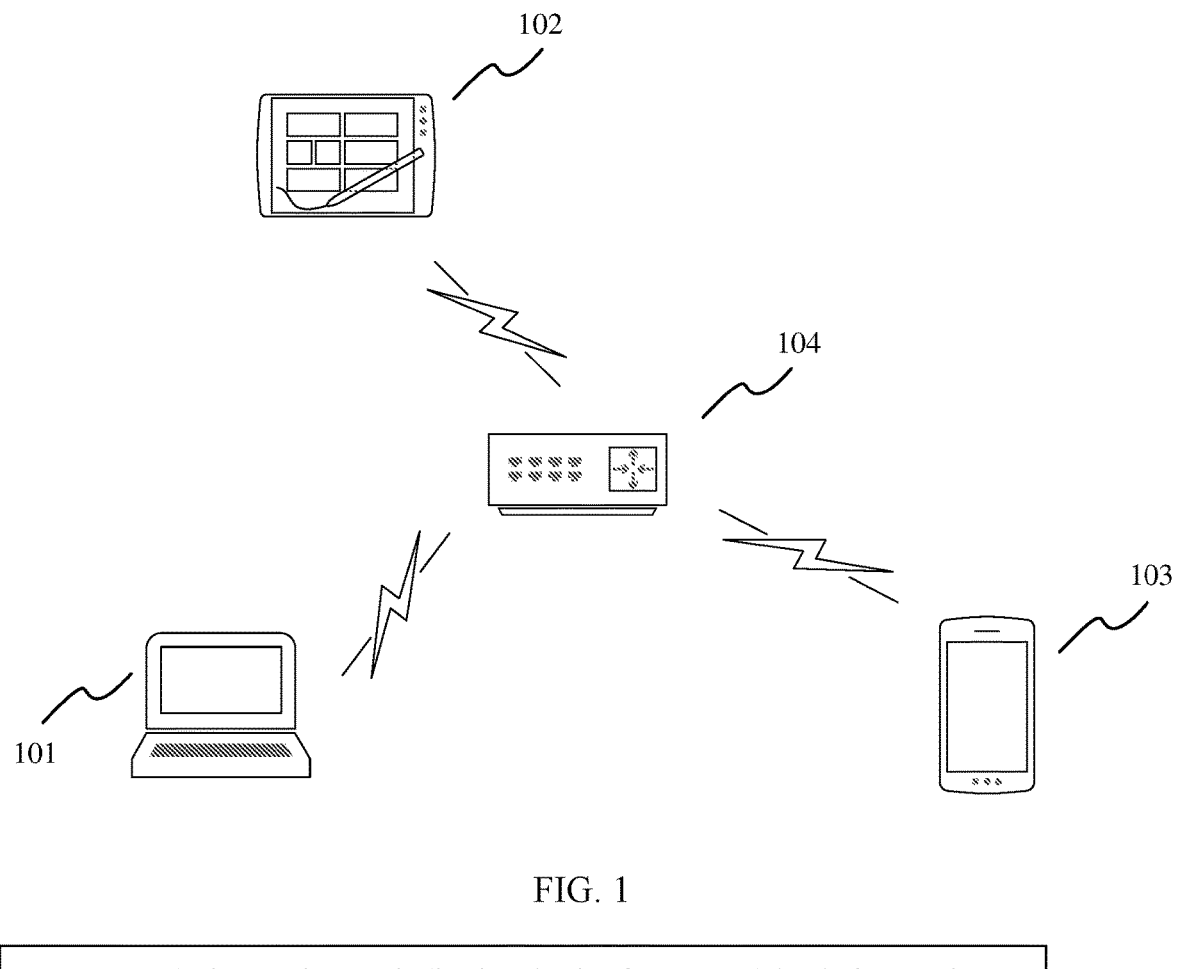

FIG. 1

| A current device receives an indication that is of a user and that is for opening a target file | S20 |
|---|---|

| In response to the indication for opening the target file, the current device determines, based on stored metadata of the target file, a device that accesses the target file last time, a device in which the file is located, and a connection record | S21 |

| The current device obtains file data of the target file from at least one of the device that accesses the target file last time and the device in which the file is located | S22 |

| The current device displays to-be-displayed content based on at least one of the connection record of the target file and the file data of the target file | S23 |

FIG. 2

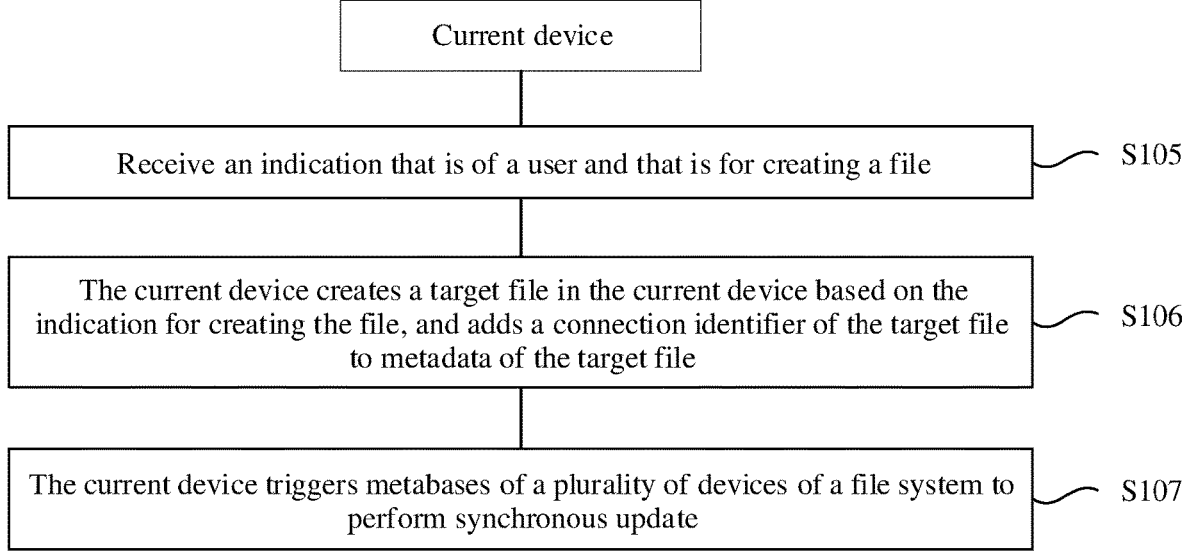

Current device

Receive an indication that is of a user and that is for creating a file        S105

The current device creates a target file in the current device based on the indication for creating the file, and adds a connection identifier of the target file to metadata of the target file        S106

The current device triggers metabases of a plurality of devices of a file system to perform synchronous update        S107

FIG. 3c

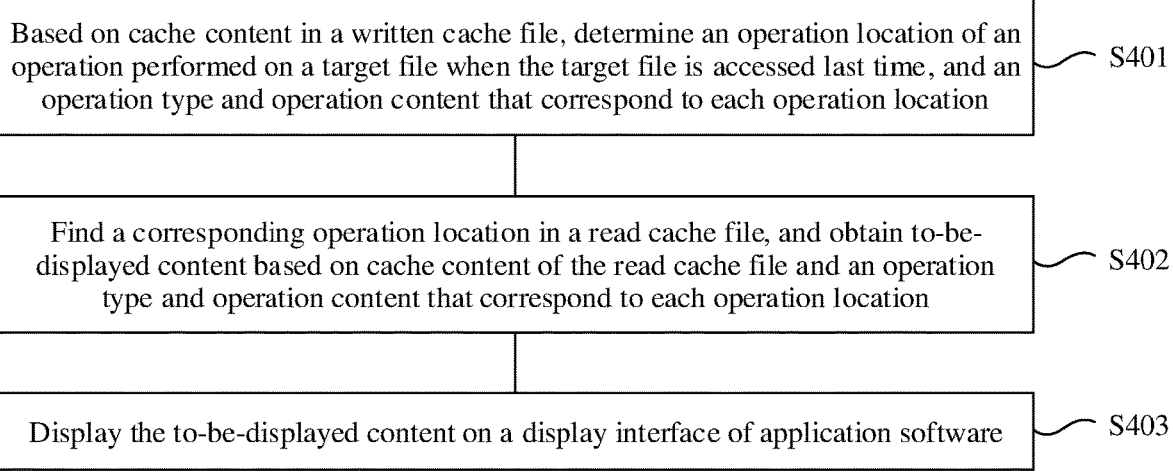

Based on cache content in a written cache file, determine an operation location of an operation performed on a target file when the target file is accessed last time, and an operation type and operation content that correspond to each operation location ⟋ S401

Find a corresponding operation location in a read cache file, and obtain to-be-displayed content based on cache content of the read cache file and an operation type and operation content that correspond to each operation location ⟋ S402

Display the to-be-displayed content on a display interface of application software ⟋ S403

FIG. 6

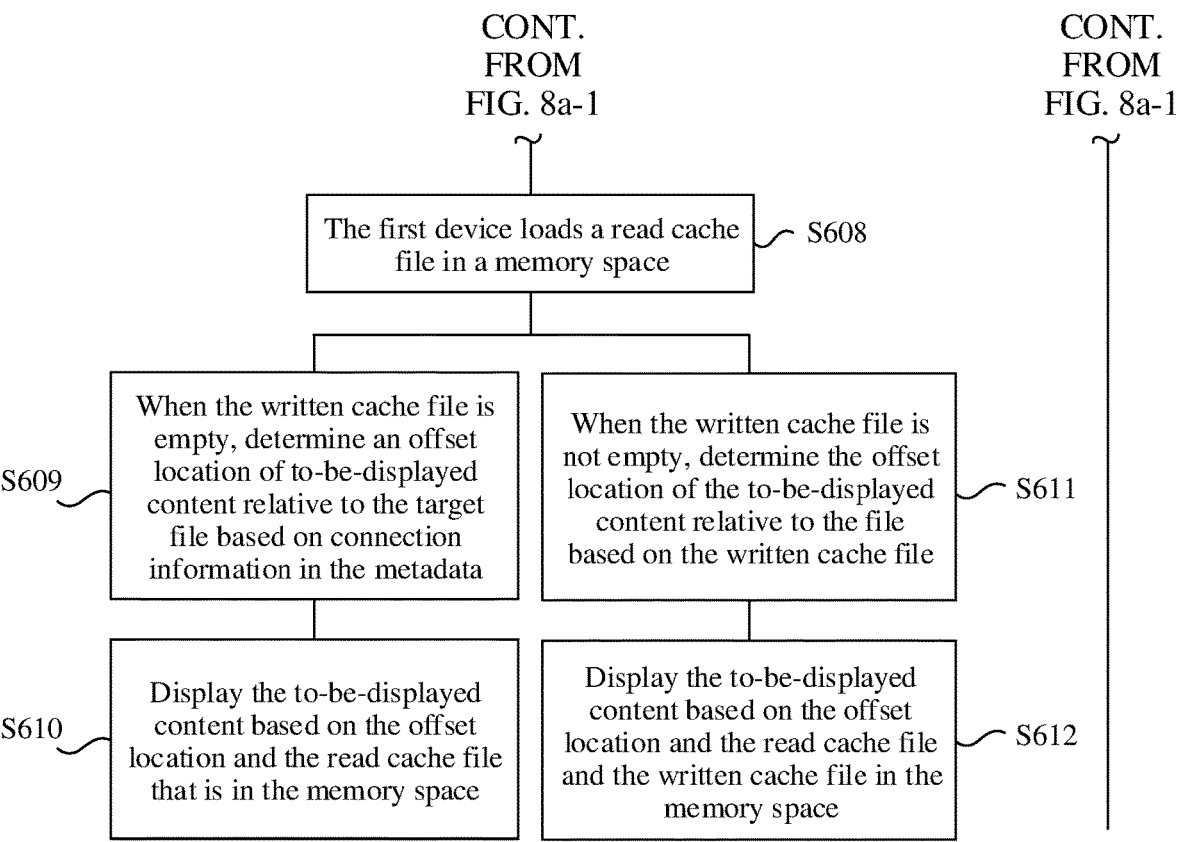

CONT.
FROM
FIG. 8a-1

CONT.
FROM
FIG. 8a-1

The first device loads a read cache file in a memory space   S608

When the written cache file is empty, determine an offset location of to-be-displayed content relative to the target file based on connection information in the metadata   S609

When the written cache file is not empty, determine the offset location of the to-be-displayed content relative to the file based on the written cache file   S611

Display the to-be-displayed content based on the offset location and the read cache file that is in the memory space   S610

Display the to-be-displayed content based on the offset location and the read cache file and the written cache file in the memory space   S612

FIG. 8a-2

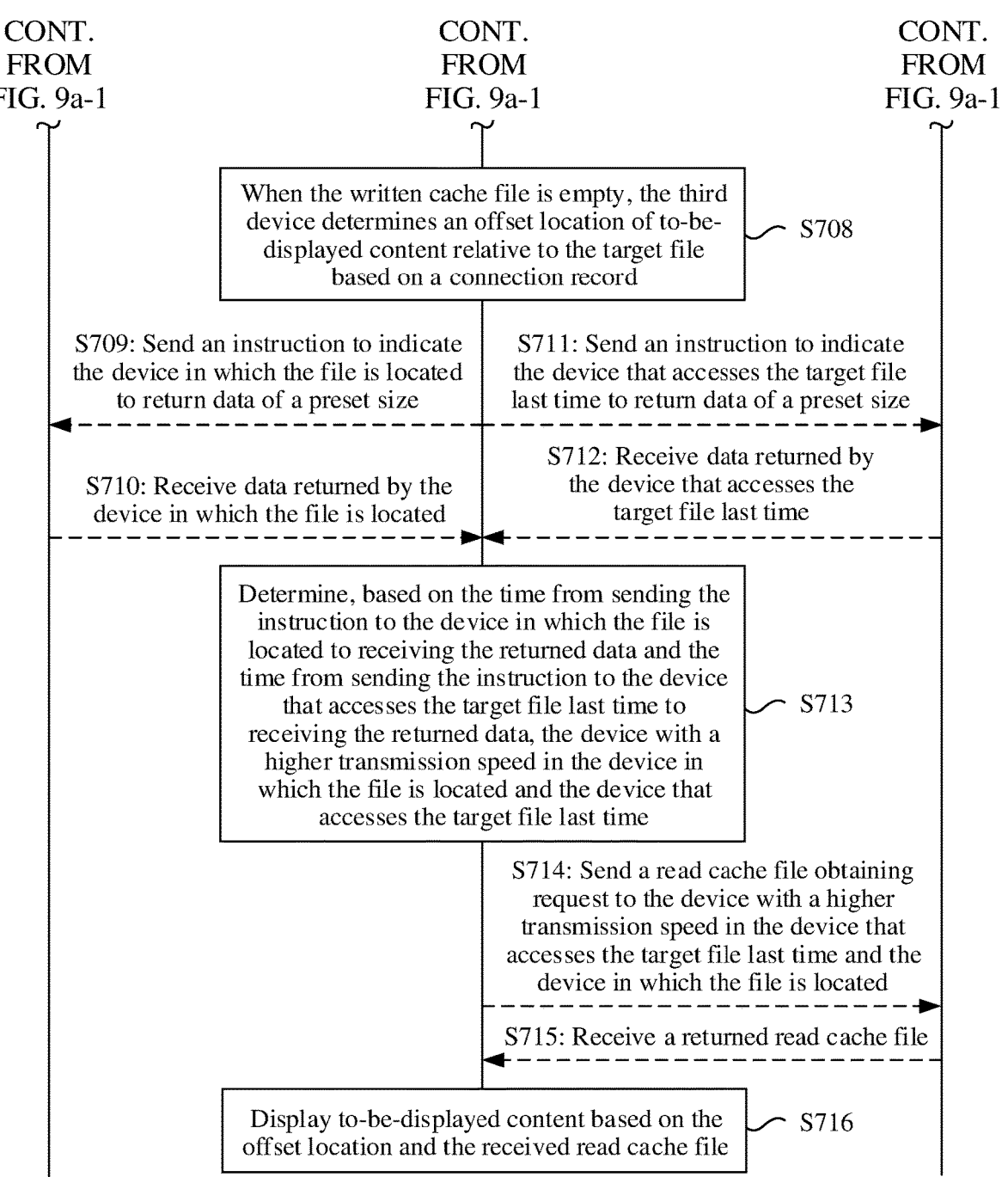

CONT.
FROM
FIG. 9a-1

CONT.
FROM
FIG. 9a-1

CONT.
FROM
FIG. 9a-1

When the written cache file is empty, the third device determines an offset location of to-be-displayed content relative to the target file based on a connection record ⟋ S708

S709: Send an instruction to indicate the device in which the file is located to return data of a preset size S711: Send an instruction to indicate the device that accesses the target file last time to return data of a preset size S712: Receive data returned by the device that accesses the target file last time S710: Receive data returned by the device in which the file is located Determine, based on the time from sending the instruction to the device in which the file is located to receiving the returned data and the time from sending the instruction to the device that accesses the target file last time to receiving the returned data, the device with a higher transmission speed in the device in which the file is located and the device that accesses the target file last time ⟋ S713

S714: Send a read cache file obtaining request to the device with a higher transmission speed in the device that accesses the target file last time and the device in which the file is located S715: Receive a returned read cache file Display to-be-displayed content based on the offset location and the received read cache file ⟋ S716

FIG. 9a-2

CONT.
FROM

TO

CONT.
FROM
FIG. 12B
TO
FIG. 12D
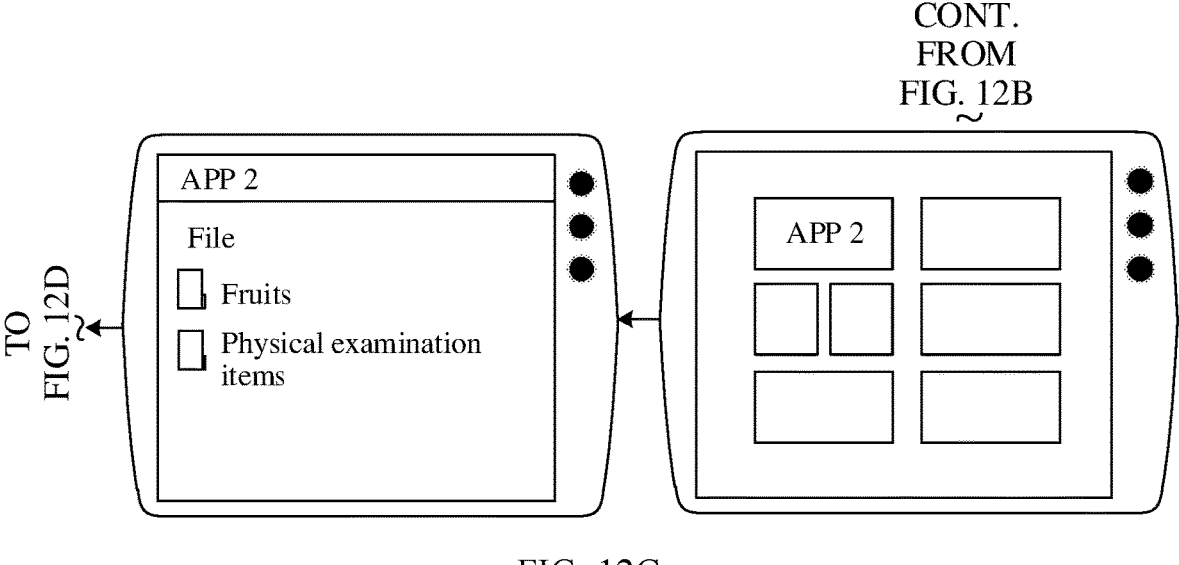
FIG. 12C
CONT.
FROM
FIG. 12C
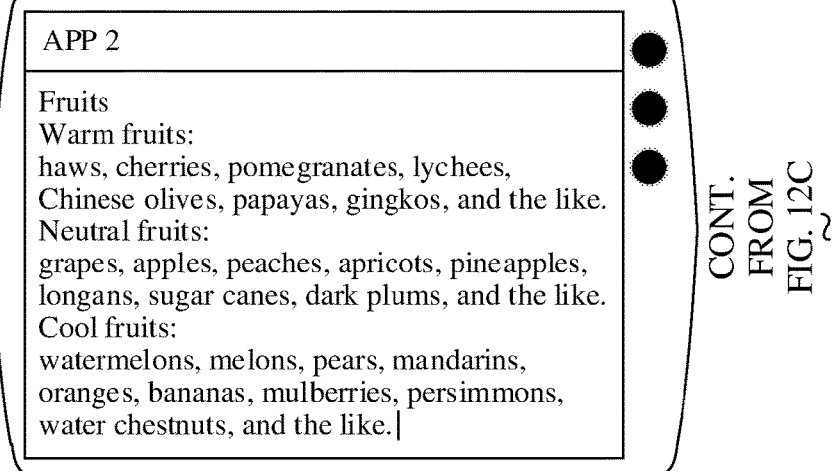
FIG. 12D

```
Receiving module ────── 1301

Determining module ────── 1302

Obtaining module ────── 1303

Display module ────── 1304
```

200

FILE CONNECTION METHOD AND APPARATUS, TERMINAL DEVICE, AND STORAGE MEDIUM

This application is a national stage of International Application No. PCT/CN2022/070080, filed on Jan. 4, 2022, which claims priority to Chinese Patent Application No. 202110185209.X, filed on Feb. 10, 2021. Both of the aforementioned applications are hereby incorporated by reference in their entireties.

TECHNICAL FIELD

This application relates to the field of terminal technologies, and in particular, to a file connection method and apparatus, a terminal device, and a storage medium.

BACKGROUND

With the development of intelligent devices, using an intelligent device to operate a file brings great convenience to a user. For example, the user may use application software of a smartphone to watch a movie, listen to music, and edit a file. Using a plurality of devices to share a file not only enables the devices to fully exert respective advantages, but also brings great convenience to an operation of the user. In a process in which the user performs an operation on a multimedia file such as a video, audio, or a document by using a plurality of intelligent devices, the user usually expects that a previous operation can be connected after switching a device. This brings convenience to collaboration between a plurality of devices of the user.

In the conventional technology, a multimedia file is usually stored in a cloud. When another device needs to access the file, the file is directly obtained from the cloud, and a connection effect between devices is implemented by transferring a location tag (a tag indicating a latest read or edit location of the file). Alternatively, device information of the terminal device and read location information of the file are stored in a server, so that after the user switches the device, the corresponding read location information is loaded from the server to implement the connection. However, there is a privacy leakage risk when the file is stored in the cloud, and cross-application file connection cannot be implemented. In addition, purchasing cloud space increases use costs of the user, and a speed of obtaining the file from the cloud is slow. This affects file obtaining efficiency to some extent. In addition, the device information and the read location information of the file are stored in the server, and cross-application file connection cannot be implemented. In addition, a use scenario has a harsh requirement, and supports limited file types. The user needs to specify device information, and the operation is complex.

SUMMARY

In view of this, this application provides a file connection method and apparatus, a terminal device, and a storage medium. According to the file connection method in embodiments of this application, cross-device and cross-application file connection can be implemented, and file connection does not need to rely on a cloud and a server, so that connection costs can be reduced.

According to a first aspect, an embodiment of this application provides a file connection method. The method is applied to a file system, the file system includes a plurality of devices, metadata of a target file is separately stored in metabases of the plurality of devices, and the method includes:

A current device receives an indication that is by a user and that is for opening the target file; in response to the indication for opening the target file, the current device determines a device that accesses the target file last time, a device in which the file is located, and a connection record based on the stored metadata of the target file, where the connection record indicates an operation location when the target file is stored last time; the current device obtains file data of the target file from one or more terminal device that last accessed the target file and the device in which the file is located, where the file data includes a read cache file and a write cache file (also referred to herein as a "written cache file"); and the current device displays to-be-displayed content based on at least one of the connection record of the target file and the file data of the target file.

According to the file connection method in this embodiment of this application, attribute information such as the device that accesses the file last time, the device in which the file is located, and the connection record is stored in the metabases of the devices, so that file connection does not need to rely on the cloud and the server, but obtains data information of the file from a corresponding device by using the attribute information of the file, to complete file connection, thereby implementing cross-device and cross-application connection of the file. File connection does not need to rely on the cloud and the server, so that connection costs can be reduced. File connection may be automatically completed provided that a user issues an indication on the current device to open the target file. This is convenient for the user to operate. Devices may be connected based on a cache. In this way, even if the user does not synchronize a modification to the target file stored in the device in which the file is located, file connection may be implemented, and has better performance.

According to the first aspect, in a first possible implementation of the file connection method, when the current device, the device that accesses the target file last time, and the device in which the file is located are the same, that the current device obtains file data of the target file from at least one of the device that accesses the target file last time and the device in which the file is located includes: The current device loads the written cache file and the read cache file in a memory space; and that the current device displays to-be-displayed content based on at least one of the connection record of the target file and the file data of the target file includes: When the written cache file is empty, the current device determines an offset location of the to-be-displayed content relative to the target file based on the connection record, and displays the to-be-displayed content based on the offset location and the read cache file in the memory space; or when the written cache file is not empty, the current device determines an offset location of the to-be-displayed content relative to the target file based on the written cache file, and displays the to-be-displayed content based on the offset location and the read cache file and the written cache file in the memory space.

In this manner, the file may implement cross-application connection on the device that stores the file, to improve an application scope of the file connection method.

According to the first aspect, in a second possible implementation of the file connection method, when the current device is the same as the device that accesses the target file last time, and is different from the device in which the file is located, that the current device obtains file data of the target file from at least one of the device that accesses the target file last time and the device in which the file is located includes: The current device loads the written cache file and the read cache file in a cache space; and that the current device displays to-be-displayed content based on at least one of the connection record of the target file and the file data of the target file includes: When the written cache file is empty, the current device determines an offset location of the to-be-displayed content relative to the target file based on the connection record, and displays the to-be-displayed content based on the offset location and the read cache file in the cache space; or when the written cache file is not empty, the current device determines an offset location of the to-be-displayed content relative to the target file based on the written cache file, and displays the to-be-displayed content based on the offset location and the read cache file and the written cache file in the cache space.

In this manner, the file may implement cross-application connection on any one of devices in the file system other than the device that stores the file, to improve an application scope of the file connection method.

According to the first aspect, in a third possible implementation of the file connection method, when the current device is the same as the device in which the file is located, and is different from the device that accesses the target file last time, that the current device obtains file data of the target file from at least one of the device that accesses the target file last time and the device in which the file is located includes: The current device sends a written cache file obtaining request to the device that accesses the target file last time; the current device receives the returned written cache file; and the current device loads the read cache file in a memory space; and that the current device displays to-be-displayed content based on at least one of the connection record of the target file and the file data of the target file includes: When the written cache file is empty, the current device determines an offset location of the to-be-displayed content relative to the target file based on the connection record, and displays the to-be-displayed content based on the offset location and the read cache file in the memory space; or when the written cache file is not empty, the current device determines an offset location of the to-be-displayed content relative to the target file based on the written cache file, and displays the to-be-displayed content based on the offset location and the read cache file and the written cache file in the memory space.

In this manner, the file may implement cross-device and cross-application connection on the device that stores the file, to improve an application scope of the file connection method.

According to the first aspect, in a fourth possible implementation of the file connection method, when the current device, the device that accesses the target file last time, and the device in which the file is located are all different from each other, that the current device obtains file data of the target file from at least one of the device that accesses the target file last time and the device in which the file is located includes: The current device sends a written cache file obtaining request to the device that accesses the target file last time; the current device receives the returned written cache file; the current device sends a read cache file obtaining request to a device with a higher transmission speed in the device that accesses the target file last time and the device in which the file is located; and the current device receives the returned read cache file; and that the current device displays to-be-displayed content based on at least one of the connection record of the target file and the file data of the target file includes: When the written cache file is empty, the current device determines an offset location of the to-be-displayed content relative to the target file based on the connection record, and displays the to-be-displayed content based on the offset location and the received read cache file; or when the written cache file is not empty, the current device determines an offset location of the to-be-displayed content relative to the target file based on the written cache file, and displays the to-be-displayed content based on the offset location and the received read cache file and written cache file.

In this manner, the file may implement cross-device and cross-application connection on any device of the file system, to improve an application scope of the file connection method.

According to the first aspect and any one of the implementations of the first aspect, in a fifth possible implementation of the file connection method, that the current device determines a device that accesses the target file last time, a device in which the file is located, and a connection record based on the stored metadata of the target file includes: The current device sends an instruction to the metabase of the current device, where the instruction includes a user identifier of the user and a file identifier of the target file, and the instruction is used to obtain the metadata that is of the target file and that is stored in the metabase of the current device; the metabase of the current device determines, based on the user identifier and the file identifier, whether the user has a read/write permission for the target file; the current device triggers the metabases of the plurality of devices of the file system to perform synchronous update when it is determined that the user has the read/write permission for the target file; and the current device determines, based on updated metabases, the device that accesses the target file last time, the device in which the file is located, and the connection record.

In this manner, when another user has no read/write permission for the target file, the target file is not displayed on a device used by the another user, so that data security can be improved.

According to the first aspect and any one of the implementations of the first aspect, in a sixth possible implementation of the file connection method, when the current device is the same as the device in which the file of the target file is located, the method further includes: The current device receives an indication that is of the user and that is for adding a connection identifier, where the indication for adding the connection identifier indicates that the connection identifier is added to the target file, and the connection identifier indicates that creation of the connection record of the target file is allowed in the metadata of the target file; the current device detects whether the stored metadata of the target file includes the connection identifier of the target file; when the metadata does not include the connection identifier of the target file, the current device adds, based on the indication for adding the connection identifier, the connection identifier of the target file to the metadata that is of the target file and that is stored in the current device; and the current device triggers the metabases of the plurality of devices of the file system to perform synchronous update.

In this way, the user is allowed to send the indication for adding the connection identifier, so that connected access to the file can be implemented.

According to the first aspect and any one of the first or fifth implementations of the first aspect, in a seventh possible implementation of the file connection method, when the current device is the same as the device in which the file of the target file is located, the method further includes: The current device receives an indication that is of the user and that is for creating a file, where the indication for creating the file indicates that the target file is created in the current device; the current device creates the target file in the current device based on the indication for creating the file, and adds a connection identifier of the target file to the metadata of the target file, where the connection identifier indicates that creation of the connection record of the target file is allowed in the metadata of the target file; and the current device triggers the metabases of the plurality of devices of the file system to perform synchronous update.

In this manner, cross-device access to the target file can be implemented once the target file is created. The user no longer needs to issue, to the current device, the indication for adding the connection identifier, to reduce operation complexity of the user, thereby improving user experience.

According to the first aspect and any one of the implementations of the first aspect, in an eighth possible implementation of the file connection method, the method further includes: The current device receives an indication that is of the user and that is for deleting the connection identifier and/or the connection record of the target file; the current device detects whether the stored metadata of the target file includes the connection identifier and/or the connection record of the target file; when the metadata includes the connection identifier and/or the connection record of the target file, the current device deletes, based on the indication, the connection identifier and/or the connection record of the target file from the metadata; and the current device triggers the metabases of the plurality of devices of the file system to perform synchronous update.

In this manner, based on different requirements of the user for file connection, a corresponding solution may be selected. When the solution is applied to the file system, use by the user is facilitated.

According to the first aspect and any one of the implementations of the first aspect, in a ninth possible implementation of the file connection method, when the current device is different from the device in which the file of the target file is located, the method further includes: The current device receives an indication that is of the user and that is for editing the target file; the current device performs, on a display interface of the current device based on the indication, an editing operation on displayed content of the target file; and the current device generates the written cache file of the target file based on an operation location, an operation type, and operation content.

According to the first aspect and any one of the implementations of the first aspect, in a tenth possible implementation of the file connection method, when the current device is different from the device in which the file of the target file is located, the method further includes: The current device receives a storage indication of the user for the target file; the current device sends, based on the indication, the written cache file to the device in which the file of the target file is located; when there is no connection record of the target file in the metabase of the current device, creates the connection record of the target file in the metabase of the current device based on the received storage indication of the user for the target file and the operation location in the target file; or when there is the connection record of the target file in the metabase of the current device, updates the connection record in the metabase of the current device based on the received storage indication of the user for the target file and the operation location in the target file.

In this manner, file edits can be transmitted between devices, so that latest edit content can be displayed during connected display.

According to the first aspect and any one of the implementations of the first aspect, in an eleventh possible implementation of the file connection method, the metadata of the target file further includes a file modification time of the target file, and when the current device is the same as the device in which the file of the target file is located, the method further includes: The current device receives the written cache file; the current device generates a new target file based on the written cache file and the target file that is stored in a memory; and the current device updates file modification time information in the metadata of the target file.

Based on this, synchronous update of the target file stored in the device can be implemented.

According to the first aspect and any one of the implementations of the first aspect, in a twelfth possible implementation of the file connection method, the method further includes: when the to-be-displayed content of the target file is displayed, updating the device that accesses the target file last time as the current device.

According to a second aspect, an embodiment of this application provides a file connection apparatus. The file connection apparatus is used in the file system, and the file connection apparatus includes:

a receiving module, configured to receive an indication that is by a user and that is for opening a target file; a determining module, configured to: in response to the indication for opening the target file, determine a device that accesses the target file last time, a device in which the file is located, and a connection record based on stored metadata of the target file, where the connection record indicates an operation location when the target file is stored last time; an obtaining module, configured to obtain file data of the target file from one or more terminal device that last accessed the target file and the device in which the file is located, where the file data includes a read cache file and a written cache file; and a display module, configured to display to-be-displayed content based on at least one of the connection record of the target file and the file data of the target file.

According to the second aspect, in a first possible implementation of the file connection apparatus, when the current device, the device that accesses the target file last time, and the device in which the file is located are the same, the obtaining module includes a first obtaining submodule, configured to load the written cache file and the read cache file in a memory space; and
the display module includes:
a first display submodule, configured to: when the written cache file is empty, determine an offset location of the to-be-displayed content relative to the target file based on the connection record, and display the to-be-displayed content based on the offset location and the read cache file in the memory space; and
a second display submodule, configured to: when the written cache file is not empty, determine an offset location of the to-be-displayed content relative to the target file based on the written cache file, and display the to-be-displayed content based on the offset location and the read cache file and the written cache file in the memory space.

According to the second aspect, in a second possible implementation of the file connection apparatus, when the current device is the same as the device that accesses the target file last time, and is different from the device in which the file is located, the obtaining module includes a second obtaining submodule, configured to load the written cache file and the read cache file in a cache space; and the display module includes:

a third display submodule, configured to: when the written cache file is empty, determine an offset location of the to-be-displayed content relative to the target file based on the connection record, and display the to-be-displayed content based on the offset location and the read cache file in the cache space; and a fourth display submodule, configured to: when the written cache file is not empty, determine an offset location of the to-be-displayed content relative to the target file based on the written cache file, and display the to-be-displayed content based on the offset location and the read cache file and the written cache file in the cache space.

According to the second aspect, in a third possible implementation of the file connection apparatus, when the current device is the same as the device in which the file is located, and is different from the device that accesses the target file last time, the obtaining module includes:

a third obtaining submodule, configured to send a written cache file obtaining request to the device that accesses the target file last time;

a fourth obtaining submodule, configured to receive the returned written cache file; and a fifth obtaining submodule, configured to load the read cache file in a memory space; and the display module includes:

a fifth display submodule, configured to: when the written cache file is empty, determine an offset location of the to-be-displayed content relative to the target file based on the connection record, and display the to-be-displayed content based on the offset location and the read cache file in the memory space; and a sixth display submodule, configured to: when the written cache file is not empty, determine an offset location of the to-be-displayed content relative to the target file based on the written cache file, and display the to-be-displayed content based on the offset location and the read cache file and the written cache file in the memory space.

According to the second aspect, in a fourth possible implementation of the file connection apparatus, when the current device, the device that accesses the target file last time, and the device in which the file is located are all different from each other, the obtaining module includes:

a sixth obtaining submodule, configured to send a written cache file obtaining request to the device that accesses the target file last time;

a seventh obtaining submodule, configured to receive the returned written cache file;

an eighth obtaining submodule, configured to send a read cache file obtaining request to a device with a higher transmission speed in the device that accesses the target file last time and the device in which the file is located; and a ninth obtaining submodule, configured to receive the returned read cache file; and the display module includes:

a seventh display submodule, configured to: when the written cache file is empty, determine an offset location of the to-be-displayed content relative to the target file based on the connection record, and display the to-be-displayed content based on the offset location and the received read cache file; and an eighth display submodule, configured to: when the written cache file is not empty, determine an offset location of the to-be-displayed content relative to the target file based on the written cache file, and display the to-be-displayed content based on the offset location and the received read cache file and written cache file.

According to the second aspect and any one of the implementations of the second aspect, in a fifth possible implementation of the file connection apparatus, the determining module includes:

a first determining submodule, configured to send an instruction to the metabase of the current device, where the instruction includes a user identifier of the user and a file identifier of the target file, and the instruction is used to obtain the metadata that is of the target file and that is stored in the metabase of the current device;

a second determining submodule, configured to determine, based on the user identifier and the file identifier, whether the user has a read/write permission for the target file;

a third determining submodule, configured to trigger the metabases of the plurality of devices of the file system to perform synchronous update when it is determined that the user has the read/write permission for the target file; and a fourth determining submodule, configured to determine, based on updated metabases, the device that accesses the target file last time, the device in which the file is located, and the connection record.

According to the second aspect and any one of the implementations of the second aspect, in a sixth possible implementation of the file connection apparatus, when the current device is the same as the device in which the file of the target file is located, the apparatus further includes:

a first indication receiving module, configured to receive an indication that is of the user and that is for adding a connection identifier, where the indication for adding the connection identifier indicates that the connection identifier is added to the target file, and the connection identifier indicates that creation of the connection record of the target file is allowed in the metadata of the target file;

a first detection module, configured to detect whether the stored metadata of the target file includes the connection identifier of the target file;

an identifier adding module, configured to: when the metadata does not include the connection identifier of the target file, add, by the current device based on the indication for adding the connection identifier, the connection identifier of the target file to the metadata that is of the target file and that is stored in the current device; and a first update module, configured to trigger the metabases of the plurality of devices of the file system to perform synchronous update.

According to the second aspect and any one of the first to fifth implementations of the second aspect, in a seventh possible implementation of the file connection apparatus, when the current device is the same as the device in which the file of the target file is located, the apparatus further includes:

a second indication receiving module, configured to receive an indication that is of the user and that is for creating a file, where the indication for creating the file indicates that the target file is created in the current device;

a file creation module, configured to: create the target file in the current device based on the indication for creating the file, and add a connection identifier of the target file to the metadata of the target file, where the connection identifier indicates that creation of the connection record of the target file is allowed in the metadata of the target file; and a second update module, configured to trigger the metabases of the plurality of devices of the file system to perform synchronous update.

According to the second aspect and any one of the implementations of the second aspect, in an eighth possible implementation of the file connection apparatus, the apparatus further includes:

a third indication receiving module, configured to receive an indication that is of the user and that is for deleting the connection identifier and/or the connection record of the target file;

a second detection module, configured to detect, by the current device, whether the stored metadata of the target file includes the connection identifier and/or the connection record of the target file;

a deletion module, configured to delete, by the current device based on the indication, the connection identifier and/or the connection record of the target file from the metadata when the metadata includes the connection identifier and/or the connection record of the target file; and a third update module, configured to trigger the metabases of the plurality of devices of the file system to perform synchronous update.

According to the second aspect and any one of the implementations of the second aspect, in a ninth possible implementation of the file connection apparatus, when the current device is different from the device in which the file of the target file is located, the apparatus further includes:

a fourth indication receiving module, configured to receive an indication that is of the user and that is for editing the target file;

an editing module, configured to perform, on a display interface of the current device based on the indication, an editing operation on displayed content of the target file; and a first generation module, configured to generate the written cache file of the target file based on an operation location, an operation type, and operation content.

According to the second aspect and any one of the implementations of the second aspect, in a tenth possible implementation of the file connection apparatus, when the current device is different from the device in which the file of the target file is located, the apparatus further includes:

a fifth indication receiving module, configured to receive a storage indication of the user for the target file;

a sending module, configured to send, based on the indication, the written cache file to the device in which the file of the target file is located;

a record creation module, configured to: when there is no connection record of the target file in the metabase of the current device, create the connection record of the target file in the metabase of the current device based on the received storage indication of the user for the target file and the operation location in the target file; and a fourth update module, configured to: when there is the connection record of the target file in the metabase of the current device, update the connection record in the metabase of the current device based on the received storage indication of the user for the target file and the operation location in the target file.

According to the second aspect and any one of the implementations of the second aspect, in an eleventh possible implementation of the file connection apparatus, the metadata of the target file further includes a file modification time of the target file, and when the current device is the same as the device in which the file of the target file is located, the apparatus further includes:

a file receiving module, configured to receive the written cache file;

a second generation module, configured to generate a new target file based on the written cache file and the target file that is stored in a memory; and a fifth update module, configured to update file modification time information in the metadata of the target file.

According to the second aspect and any one of the implementations of the second aspect, in a twelfth possible implementation of the file connection apparatus, the apparatus further includes:

a sixth update module, configured to: when the to-be-displayed content of the target file is displayed, update the device that accesses the target file last time as the current device.

According to a third aspect, an embodiment of this application provides a terminal device, including: a processor; and a memory, configured to store instructions that can be executed by the processor. When the processor is configured to execute the instructions, one or more file connection methods in the first aspect or the plurality of possible implementations of the first aspect are implemented.

According to a fourth aspect, an embodiment of this application provides a non-volatile computer-readable storage medium, storing computer program instructions. When the computer program instructions are executed by a processor, one or more file connection methods in the first aspect or the plurality of possible implementations of the first aspect are implemented.

These aspects and other aspects of this application are more concise and more comprehensible in descriptions of the following (a plurality of) embodiments.

BRIEF DESCRIPTION OF DRAWINGS

The accompanying drawings included in this specification and constituting a part of this specification and this specification jointly show example embodiments, features, and aspects of this application, and are intended to explain the principles of this application.

FIG. 1 shows an example application scenario according to an embodiment of this application;

FIG. 2 is an example flowchart of a file connection method according to an embodiment of this application;

FIG. 3*c* is a schematic diagram of another example process of creating a connection identifier according to an embodiment of this application;

FIG. 6 is an example flowchart of step S310 according to an embodiment of this application;

FIG. 8*a*-1 and FIG. 8*a*-2 are a schematic diagram of a file connection method in another example application scenario according to an embodiment of this application;

FIG. 9*a*-1 and FIG. 9*a*-2 are a schematic diagram of a file connection method in another example application scenario according to an embodiment of this application;

FIG. 9*b*-1 and FIG. 9*b*-2 are a schematic diagram of a file connection method in another example application scenario according to an embodiment of this application;

FIG. 12A to FIG. 12D show an example application scenario of interaction between a user and a device according to an embodiment of this application;

DESCRIPTION OF EMBODIMENTS

The following describes various example embodiments, features, and aspects of this application in detail with reference to the accompanying drawings. Identical reference signs in the accompanying drawings represent elements that have same or similar functions. Although various aspects of embodiments are shown in the accompanying drawings, unless otherwise particularly specified, the accompanying drawings do not need to be drawn to scale.

The specific term "example" herein means "used as an example, embodiment, or illustration". Any embodiment described as an "example" herein is not necessarily explained as being superior or better than other embodiments.

In addition, to better describe this application, numerous specific details are given in the following specific implementations. A person skilled in the art should understand that this application can also be implemented without some specific details. In some examples, methods, means, elements, and circuits that are well-known to a person skilled in the art are not described in detail, so that the subject of this application is highlighted.

In view of the disadvantages that file connection cannot be performed across applications and costs are high in the conventional technology, an embodiment of this application provides a file connection method, so that cross-device and cross-application connected access to a file can be implemented. In addition, file connection does not require additional cloud and server costs, and is also relatively convenient for a user.

Figures 1, 8A:
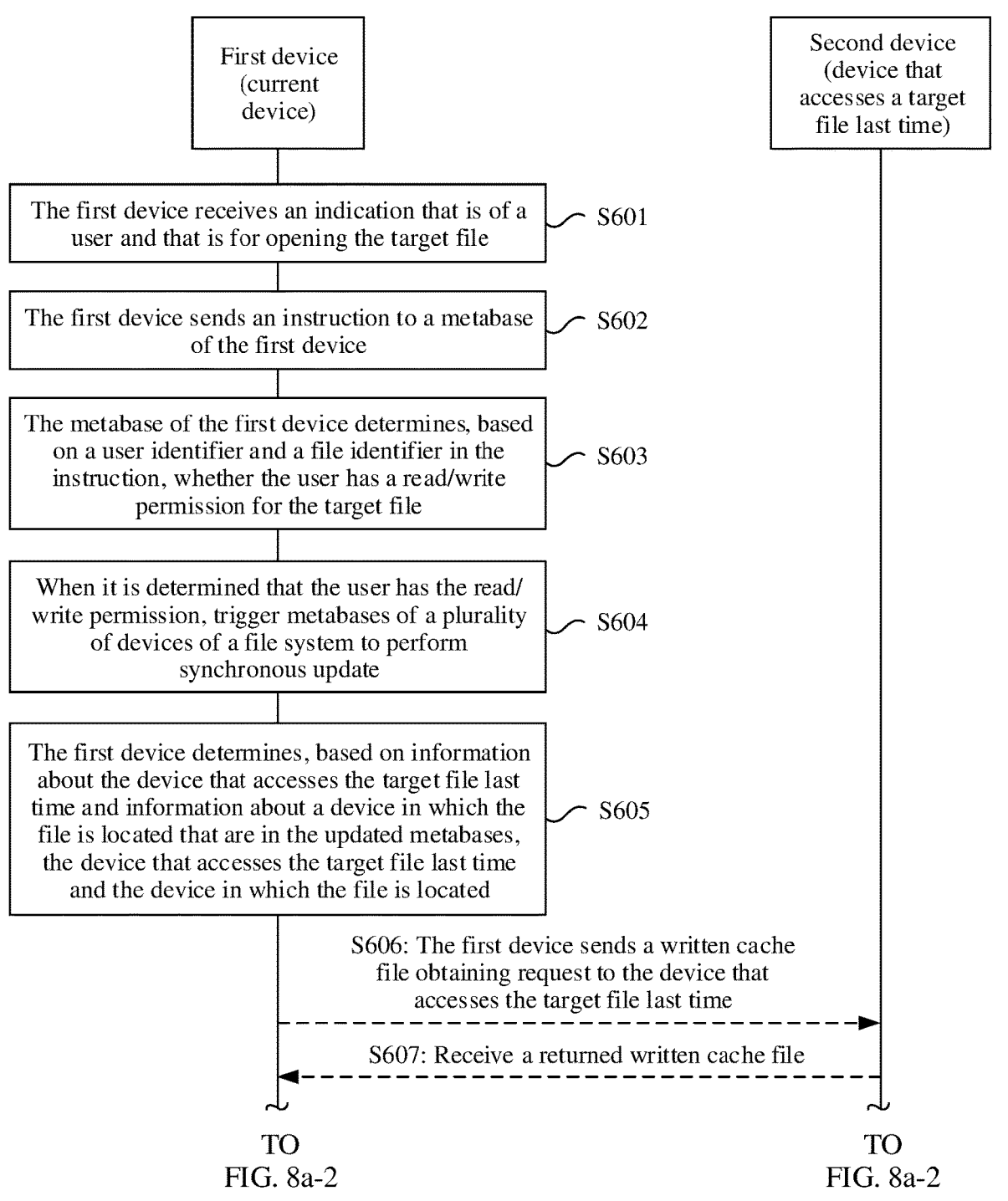
Figure 8B:
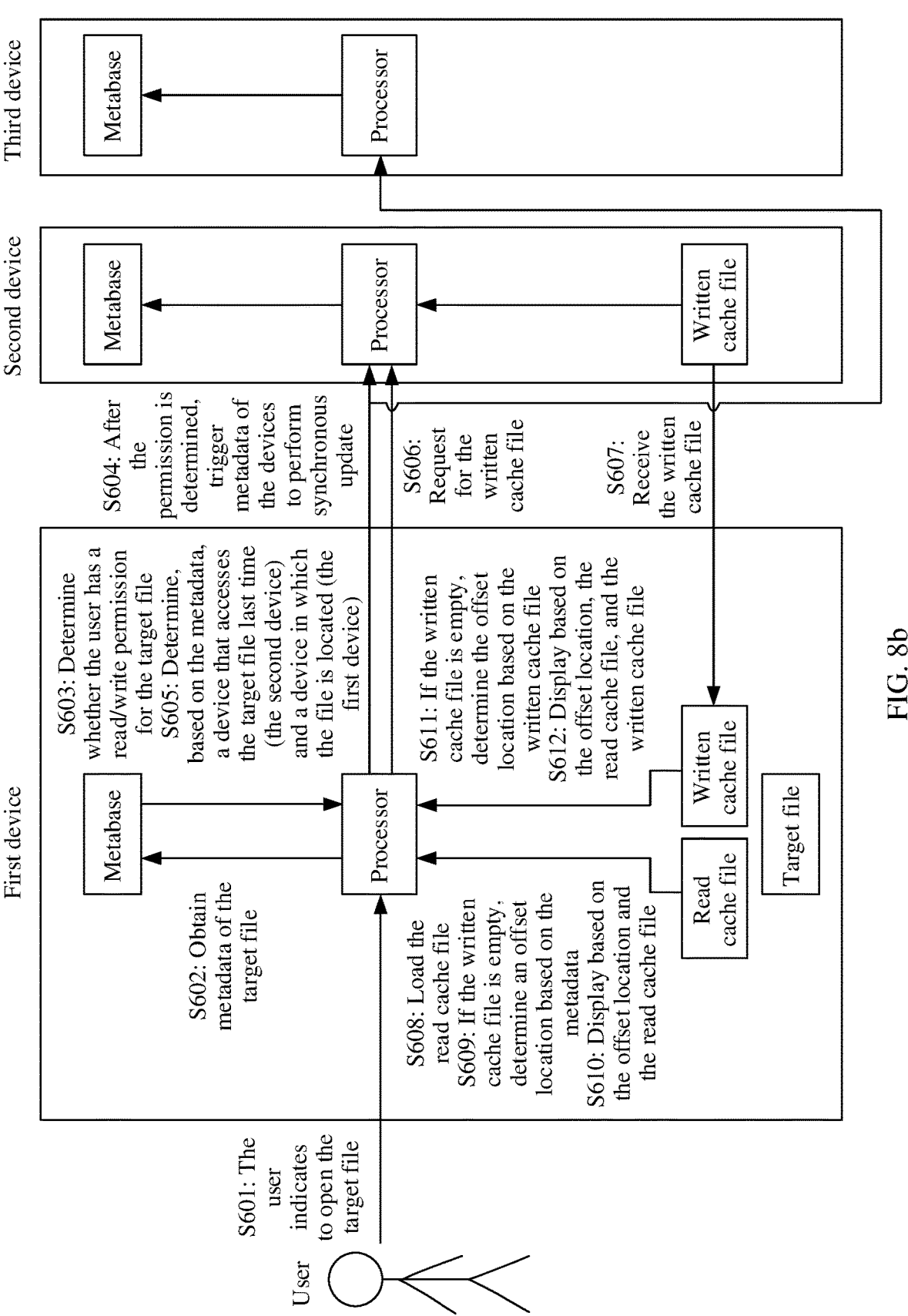
FIG. 8*b* is a schematic diagram of a file connection method in another example application scenario according to an embodiment of this application.

The file connection method in this embodiment of this application may be applied to a file system. FIG. 1 shows an example application scenario according to an embodiment of this application. A first device, a second device, and a third device may be devices of any type, including but not limited to a smartphone, a personal computer, a tablet computer, and the like.

As shown in FIG. 1, in an example application scenario, the file system may include a first device 101 (a device in which a file of a target file is located) that stores the target file, a second device 102, and a third device 103. The first device 101, the second device 102, and the third device 103 each include a display apparatus such as a display screen, and may display files of a plurality of types (for example, a document, a video, and audio). The second device 102 and the third device 103 may access the target file on the first device 101 to read or edit the target file, and the second device 102 and the third device 103 may also access each other to read or edit a file that is being edited by each other. The first device 101, the second device 102, and the third device 103 may synchronously store metadata of the target file (for example, the metadata is stored in a metabase of each device). Table 1 shows an example of a data structure of metadata according to an embodiment of this application.

TABLE 1

| File name |
| --- |
| File size |
| File modification time |
| File access time |
| File creation time |
| File user identification |
| File group identification |
| Device in which the file is located |
| File index node |
| File type |
| Access device record |
| Connection information |
| . . . |

As shown in Table 1, the metadata includes:

File name, used to display the file name. A user may view the file name and select a file to issue an indication for opening the file.

File size, used to display a size of data of the file.

File modification time, used to record time information when a new file is generated, based on an existing file, on a device that stores the file.

File access time, used to record a time when the file is opened and displayed on the device last time.

File creation time, used to record time information when the file is created.

File user identification (UID, User Identification), used to record a user who can perform an operation on the file, that is, a file owner. A user who has a read/write permission for the file may be determined by setting the file user identification.

File group identification (GID, Group Identification), used to record a user group, that is, the user group to which the file owner belongs.

Device in which the file is located: used to record the device that stores the file. The device that is in the file system (for example, within networking) and that stores the to-be-opened file may be determined by querying information that is about the device in which the file is located and that is in the metadata.

File index node, used to record an index node of storage of the file in the device that stores the file. Based on the file index node, a device may find a storage location of the file in a hard disk, and read file content in the hard disk into a memory.

File type, used to record a type of the file, for example, a txt form, a doc form, or a rmvb form.

Device access record, used to record a device that opens the file last time. The device on which the to-be-opened file is opened last time may be determined by querying information that is about a device that accesses the target file last time and that is in the metadata.

Connection information, including a connection identifier and a connection record. The connection identifier is used to enable the file to be connected, and the connection record is used to record an operation location of a last operation in the file. Based on the connection information, the location of the last operation may be located when the file is opened for display.

When a target file exists on the first device, and the user wants to share the target file on other devices (for example, the second device and the third device) in the file system and perform connected access, the other devices (for example, the second device and the third device) and the first device may be added to a same local area network, for example, connected to same Wi-Fi (for example, this is implemented by separately communicating with a router 104 in FIG. 1), or a local area network of the first device, the second device, and the third device is created, so that the first device, the second device, and the third device can exchange data in the network. A device in the file system may also be referred to as a device within networking.

Metadata that is of the target file and that is stored in each device may be periodically and synchronously updated, or each time the target file is opened, a device that opens the target file (a current device) triggers synchronous update, or the device triggers synchronous update each time the device performs an operation on the target file. The metadata may be used to record a device that operates the target file last time (the device that accesses the target file last time), a device that stores the target file (a device in which the target file is located, and in this application scenario, the first device), and a location of an operation on the file in the file when the file is stored last time (a connection record), and the second device and the third device may store read file data of the target file and a location of a latest operation for the file in the file by using a cache space. Based on the file connection method in this embodiment of this application, cross-application file connected access can be implemented in the foregoing file system.

The following describes an execution procedure of a file connection method according to an embodiment of this application with reference to the foregoing example application scenario and FIG. 2 to FIG. 12D.

Figures 1, 9A:
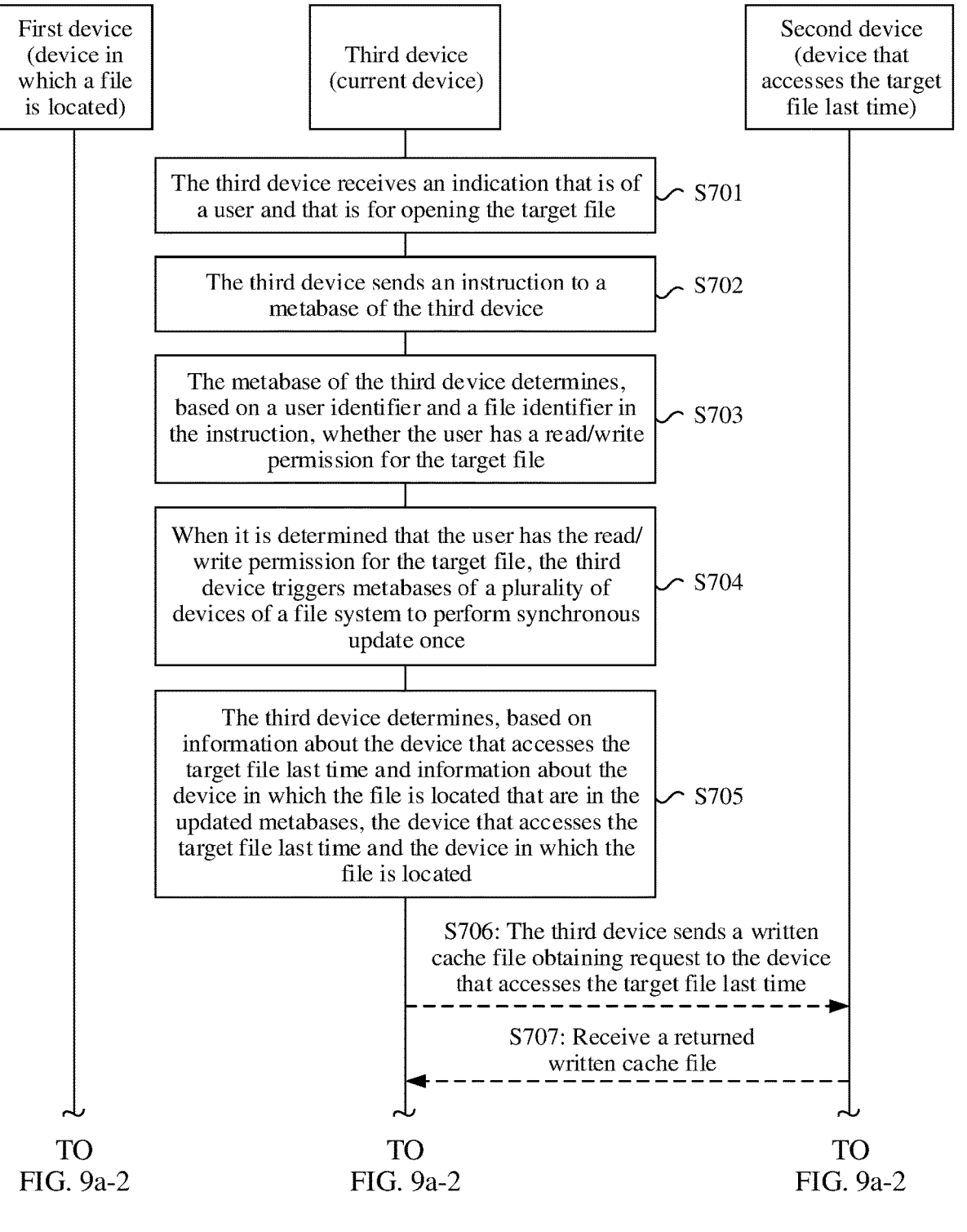
Figures 1, 9B:
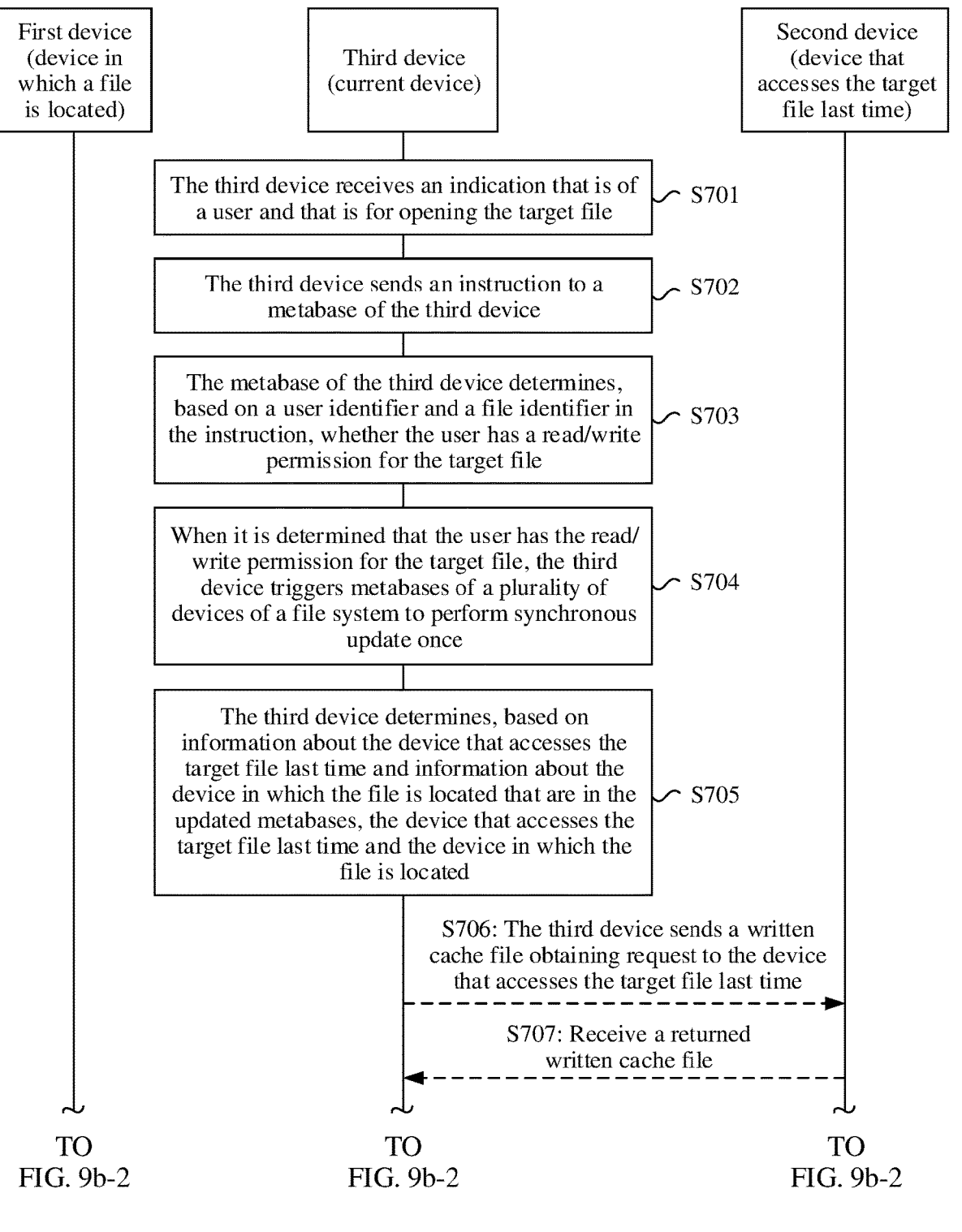
Figures 2, 9B:
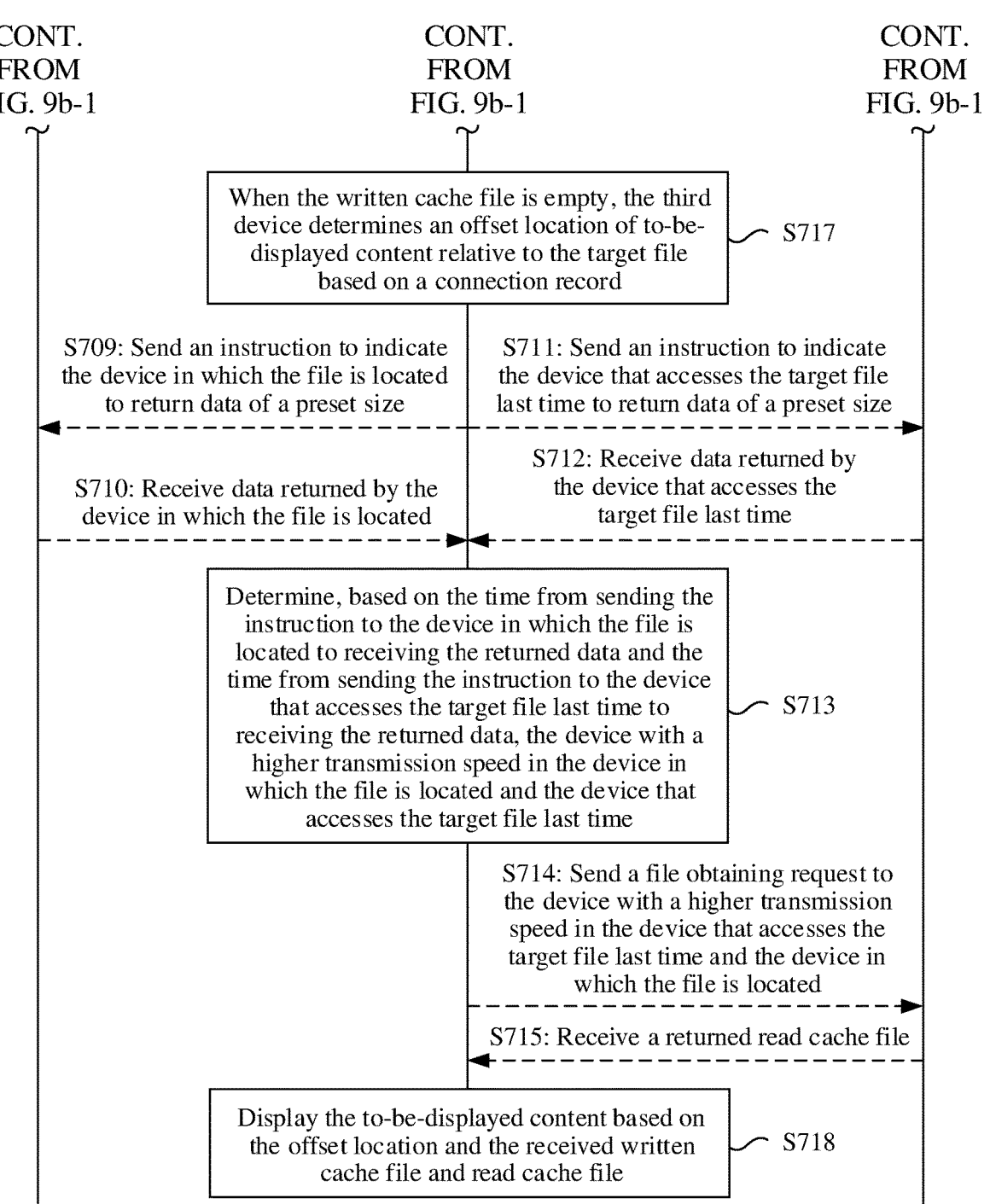

FIG. 2 is an example flowchart of a file connection method according to an embodiment of this application. In a possible implementation, the file connection method in this embodiment of this application is applied to a file system, the file system includes a plurality of devices, metadata of a target file is separately stored in metabases of the plurality of devices, and the file connection method in this embodiment of this application includes the following steps.

S20: A current device receives an indication that is by a user and that is for opening the target file.

S21: In response to the indication for opening the target file, the current device determines, based on the stored metadata of the target file, a device that accesses the target file last time, a device in which the file is located, and a connection record, where the connection record indicates an operation location when the target file is stored last time.

S22: The current device obtains file data of the target file from one or more terminal device that last accessed the target file and the device in which the file is located, where the file data includes a read cache file and a write cache file (also referred to herein as a "written cache file").

S23: The current device displays to-be-displayed content based on at least one of the connection record of the target file and the file data of the target file.

According to the file connection method in this embodiment of this application, attribute information such as the device that accesses the file last time, the device in which the file is located, and the connection record is stored in the metabases, so that file connection does not need to rely on the cloud and the server, but obtains data information of the file from a corresponding device by using the attribute information of the file, to complete file connection, thereby implementing cross-device and cross-application connection of the file. File connection does not need to rely on the cloud and the server, so that connection costs can be reduced. File connection may be automatically completed provided that a user issues an indication on the current device to open the target file. This is convenient for the user to operate. Devices may be connected based on a cache. In this way, even if the user does not synchronize a modification to the target file stored in the device in which the file is located, file connection may be implemented, and has better performance.

In a possible implementation, a prerequisite for connected access to the target file between the plurality of devices of the file system is that the target file has a connection identifier. The user may select the target file and perform setting, so that connected access by another device to the target file can be implemented. In response to a setting operation of the user, the first device may create a connection identifier for the target file. The connection identifier indicates that creation of a device access record and a connection record is allowed in the metadata of the target file, the device access record indicates a target device that operates the target file last time in the plurality of devices in the file system, and the connection record includes a location of a latest operation for the file in the file. The user may also select a plurality of target files in batches, to create connection identifiers respectively for the plurality of target files.

FIG. 3a, FIG. 3b, FIG. 3c, and FIG. 3d show example processes of creating a connection identifier. When the target file has a connection identifier, cross-device and cross-application file connection may be completed. When the current device is the same as the device in which the file of the target file is located, the connection identifier of the target file may be created on the current device.

Figure 3A:
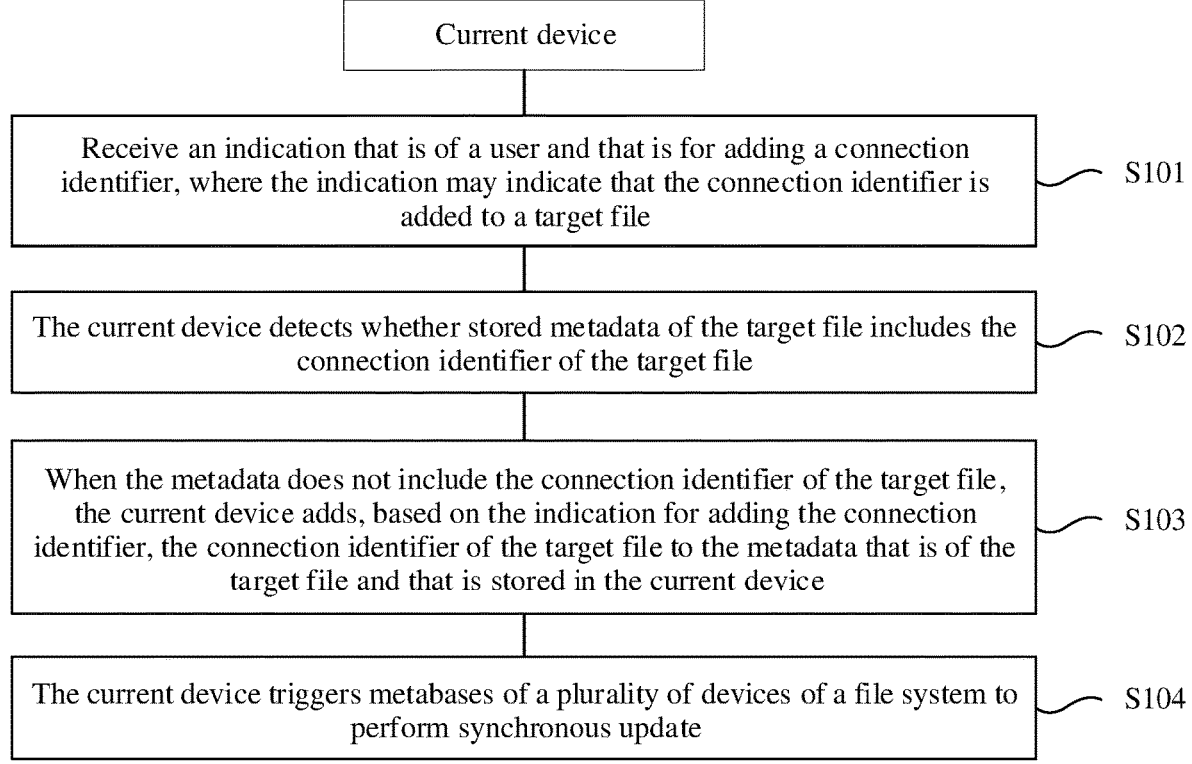
FIG. 3*a* is a schematic diagram of an example process of creating a connection identifier according to an embodiment of this application.
Figure 3B:
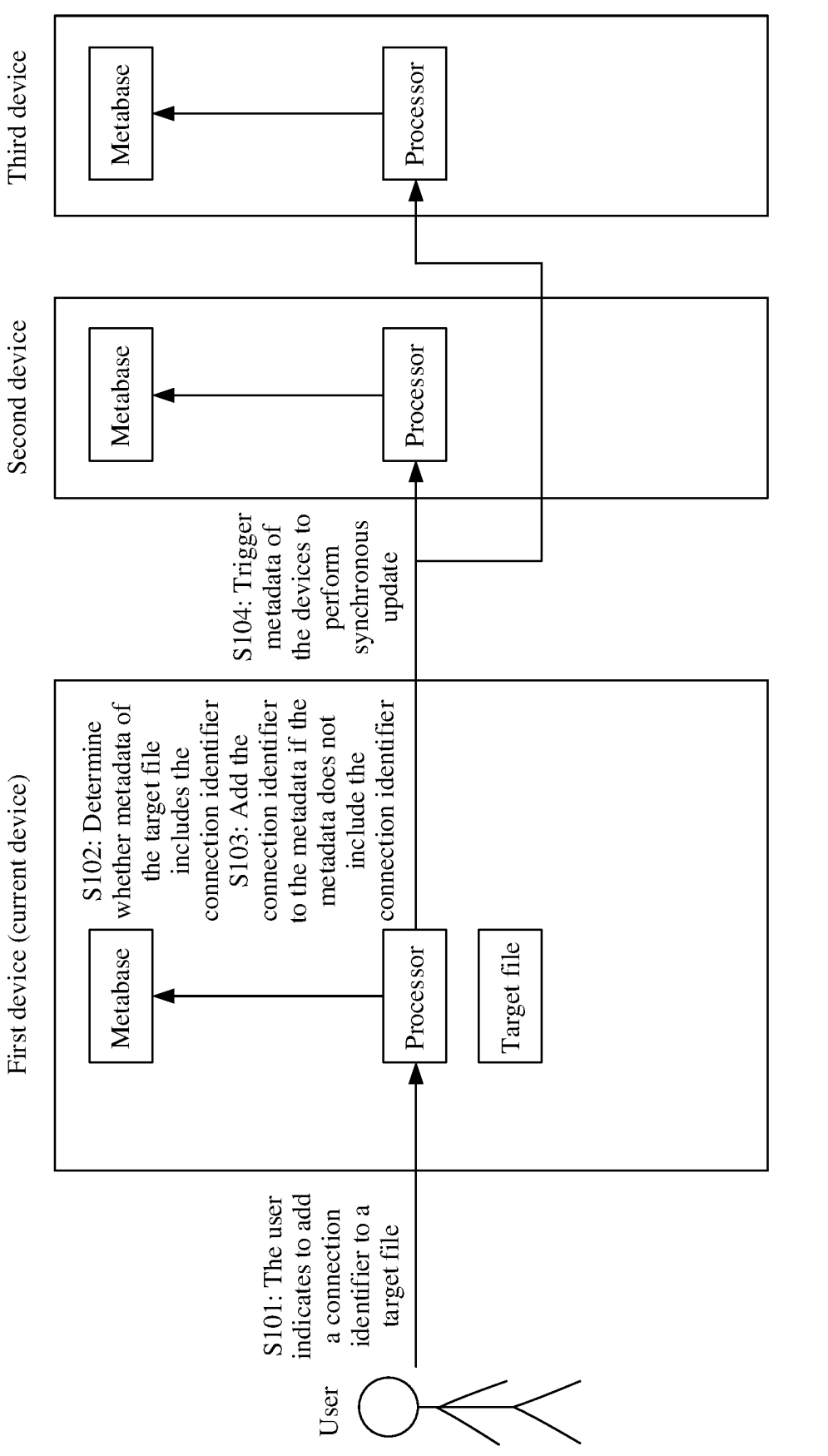
FIG. 3*b* is a schematic diagram of an example process of creating a connection identifier according to an embodiment of this application.

With reference to FIG. 3a and FIG. 3b, in step S101, the current device receives an indication that is of the user and that is for adding a connection identifier, where the indication for adding the connection identifier may indicate that the connection identifier is added to the target file, and the connection identifier indicates that creation of the connection record of the target file is allowed in the metadata of the target file.

In step S102, the current device detects whether the stored metadata of the target file includes the connection identifier of the target file.

In step S103, when the metadata does not include the connection identifier of the target file, the current device adds, based on the indication for adding the connection identifier, the connection identifier of the target file to the metadata that is of the target file and that is stored in the current device.

In step S104, the current device triggers the metabases of the plurality of devices of the file system to perform synchronous update.

The current device may be the device in which the target file is located, that is, the first device.

In a possible implementation, each device of the file system may include a metabase, which may be used to store data information that describes an attribute of the target file. The connection identifier is file attribute information indicating that cross-device connected access to the file is allowed in the file system.

In a synchronous update process, the first device may change an update time (or a version identifier) of the metadata of the target file to a time for adding the connection identifier (or change to a new version identifier), and another device obtains the update time (or the version identifier) of the device that triggers the synchronous update (the first device herein). When it is detected that the update time of the first device is later than the update time of the another device (or the version identifier of the first device is later than the version identifier of the another device), the latest metadata may be obtained from the first device, to implement synchronous update of the metadata of the target file on each device. If the another device detects that the update time of the device that triggers the synchronous update is earlier than the update time of the another device (or when the version identifier of the first device is earlier than the version identifier of the another device), the another device may alternatively send its own metadata to the device that triggers the synchronous update, to implement synchronous update. After the synchronous update, the metadata of the target file stored in the plurality of devices (for example, the first device, the second device, and the third device) within the networking includes the connection identifier of the target file. In this way, the plurality of devices in the file system can view a name of the target file in a shared list, so that the user can send, on different devices, the indication for opening the target file.

In a possible implementation, the first device may view, in a shared list of the first device, the file name of the file that is stored in the plurality of devices of the file system and that has the connection identifier. The connection identifier of the target file is a file-level mark, and corresponds to the target file. When the metadata of the target file includes the connection identifier, the target file may be added to the shared list, and the user may view the shared list by using each device within the networking, and access the target file in the shared list. After the user opens the target file on the first device, when the metadata of the target file has the connection identifier, the first device may update the connection record in the metadata based on a received storage operation performed by the user on the target file, so that the operation location, when the target file is stored last time, that is recorded in the connection record is kept up to date. When the file metadata has no connection record, the first device may create the connection record of the target file in the metadata of the first device, and record the operation location when the target file is stored last time.

In this manner, the user only needs to send, on the device in which the file is located, the indication for adding the connection identifier, so that cross-device access to the target file can be implemented. For the user, the operation is simple, and user experience is improved.

In a possible implementation, when the current device is the same as the device in which the file of the target file is located, the connection identifier of the target file may also be created together with the target file.

Figure 3D:
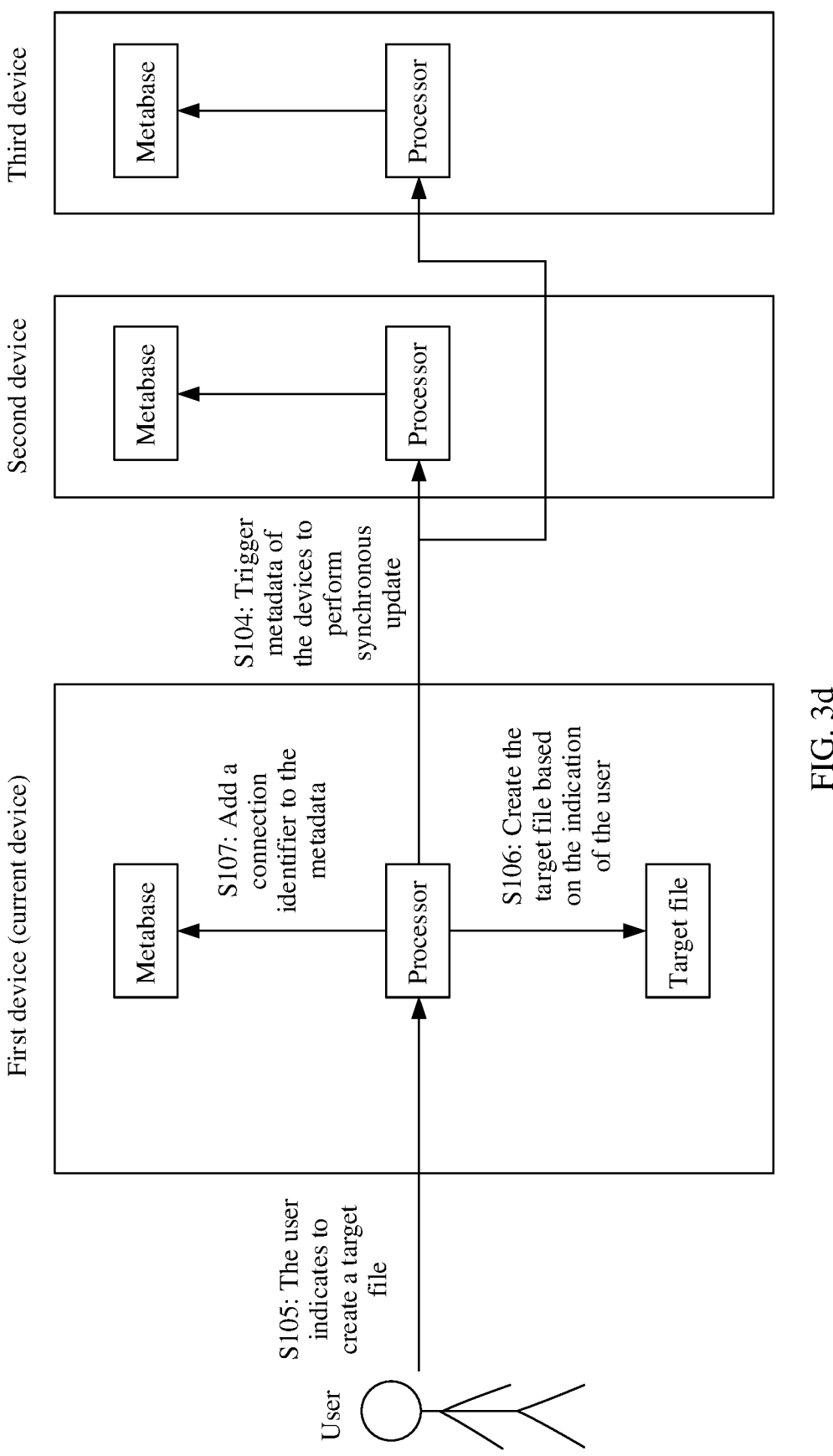
FIG. 3*d* is a schematic diagram of another example process of creating a connection identifier according to an embodiment of this application.

With reference to FIG. 3c and FIG. 3d, in step S105, the current device receives an indication that is of the user and that is for creating a file, where the indication for creating the file indicates that the target file is created in the current device.

In step S106, the current device creates the target file in the current device based on the indication for creating the file, and adds a connection identifier of the target file to the metadata of the target file, where the connection identifier indicates that creation of the connection record of the target file is allowed in the metadata of the target file.

In step S107, the current device triggers the metabases of the plurality of devices of the file system to perform synchronous update.

For example, according to the indication that is of the user and that is for creating the target file, when creating the target file, the current device also adds the metadata of the target file to the metabase of the current device. In this case, the current device may add the connection identifier of the target file to the metadata of the target file.

In this manner, cross-device access to the target file can be implemented once the target file is created. The user no longer needs to issue, to the current device, the indication for adding the connection identifier, to reduce operation complexity of the user, thereby improving user experience.

In a possible implementation, the user may also delete at least one of the connection identifier and the connection record of the target file based on a requirement. The deletion operation may be performed by a device having a delete permission in the file system, for example, the device in which the file is located that stores the target file (the first device), or may be set to be performed by any device (for example, the second device or the third device) in the file system. In a possible implementation, the connection identifier may be displayed on an interface of a terminal device (for example, displayed as an icon near the target file), and may be viewed and operated (for example, deleted) by the user. When the connection identifier of the target file is deleted, the connection record of the target file may also be deleted accordingly.

Figure 4A:
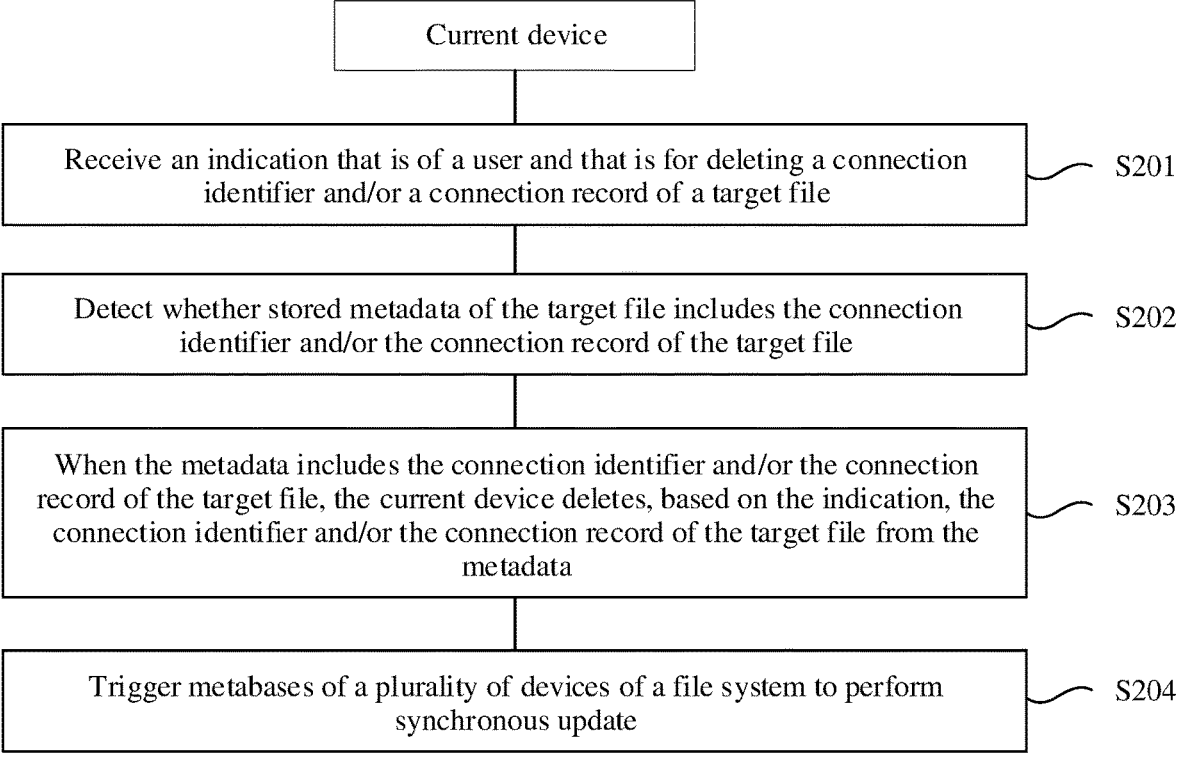
FIG. 4*a* is a schematic diagram of an example process of deleting a connection identifier and/or a connection record according to an embodiment of this application.
Figure 4B:
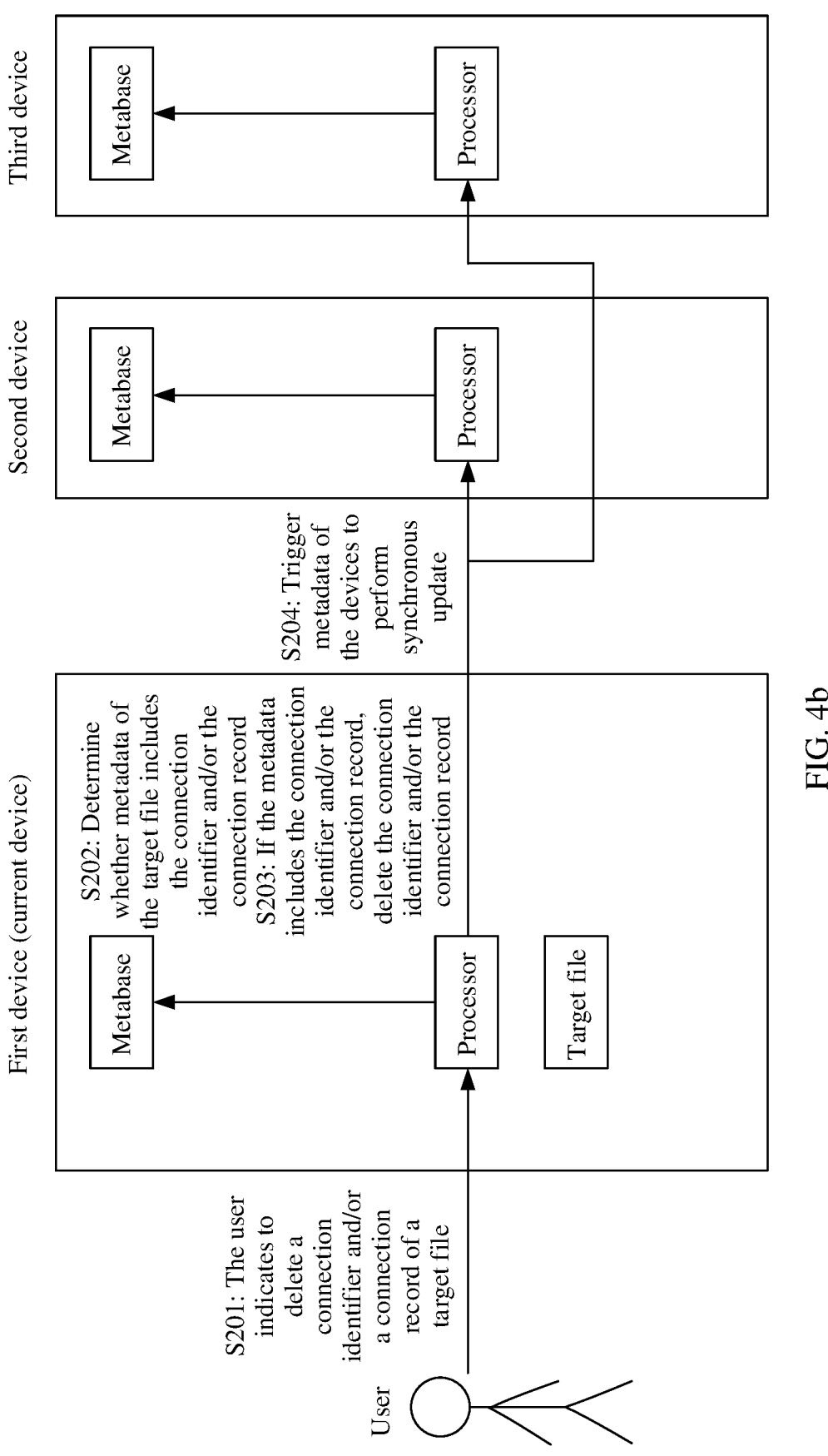
FIG. 4*b* is a schematic diagram of an example process of deleting a connection identifier and/or a connection record according to an embodiment of this application.

FIG. 4a and FIG. 4b show a process of deleting a connection identifier and/or a connection record. When there is no connection identifier, connected access to a file cannot be implemented.

Based on FIG. 4a and FIG. 4b, in step S201, the current device receives an indication that is of the user and that is for deleting the connection identifier and/or the connection record of the target file.

In step S202, the current device detects whether the stored metadata of the target file includes the connection identifier and/or the connection record of the target file.

In step S203, when the metadata includes the connection identifier and/or the connection record of the target file, the current device deletes, based on the indication, the connection identifier and/or the connection record of the target file from the metadata.

In step S204, the current device triggers the metabases of the plurality of devices of the file system to perform synchronous update.

In a possible implementation, the current device may be any device (for example, the first device) in a file system, and the target file is stored in the first device. After the current device deletes the connection identifier of the target file, cross-device access to the target file is not allowed in the file system.

Based on different requirements of the user, the user may send different deletion indications, and the current device makes different responses to the different indications. For example, when the user does not expect connected access to the target file in the file system, the user may send an indication of deleting the connection identifier of the target file, or send an indication of deleting the connection identifier and the connection record of the target file. When receiving the foregoing indication, the current device may detect whether the stored metadata of the target file includes the connection identifier, or detect whether the metadata of the target file includes the connection identifier and the connection record, and when the metadata of the first device includes the connection identifier, or includes the connection identifier and the connection record, delete the connection identifier and the connection record in the metadata that is of the target file and that is stored in the current device. After the deletion operation is completed, the first device may trigger each device within the networking to perform synchronous update.

After the synchronous update, the corresponding connection identifier and connection record are deleted from the metadata that is of the target file and that is stored in each device in the file system. Connected access to the target file cannot be implemented between the plurality of devices of the file system.

In a possible implementation, the first device may also be provided with a control that can enable and disable a file connection function, and the user may delete the connection identifier and the connection record of the target file in the metadata of the first device by closing the control. This is not limited in this application.

In a possible implementation, the user may expect that connected access to the target file can still be implemented in the file system, but new connected access does not need to be performed based on previous connected access. Based on this, the connection record of the target file may alternatively be deleted when the connection identifier of the target file is retained.

For example, the user may send an indication of deleting the connection record of the target file. When the current device receives the indication, the current device may detect whether the stored metadata of the target file includes the connection record, and when the metadata of the first device includes the connection record, delete the connection record in the stored metadata of the target file, and retain the connection identifier of the target file. After the deletion operation is completed, the first device may trigger each device within the networking to perform synchronous update.

After the synchronous update, in the metadata that is of the target file and that is stored in each device in the file system, the corresponding connection record is deleted, and the corresponding connection identifier is retained. In this case, connected access to the target file can still be implemented between the plurality of devices of the file system. However, because there is no connection record, when the target file is opened and displayed on any device (for example, the second device) in the file system next time, the target file is displayed from an initial location of the target file, and the device (the second device) completes re-creating the connection record of the target file.

In a possible implementation, a control that can delete the connection record may be disposed on each device within the networking. The user may trigger, by using the first device, the control that can delete the connection record, and send, to the first device, the indication for deleting the connection record of the target file. This is not limited in this application.

In this manner, based on different requirements of the user for file connection, a corresponding solution may be selected. When the solution is applied to the file system, use by the user is facilitated.

In a possible implementation, the user may not expect connected display of the target file when users other than the user operate a device of the file system. Based on this, a part of user permission check may be added to step S21 described above. That the current device determines, based on the stored metadata of the target file, a device that accesses the target file last time, a device in which the file is located, and a connection record includes:

The current device sends an instruction to the metabase of the current device, where the instruction includes a user identifier of the user and a file identifier of the target file, and the instruction is used to obtain the metadata that is of the target file and that is stored in the metabase of the current device. The metadata of the target file may include the connection record of the target file, information about the device that accesses the target file last time, and information about the device in which the file is located.

The metabase of the current device determines, based on the user identifier and the file identifier, whether the user has a read/write permission for the target file.

The current device triggers the metabases of the plurality of devices of the file system to perform synchronous update when it is determined that the user has the read/write permission for the target file.

In this case, the metadata that is of the target file and that is stored in each device is synchronously updated to a latest version. Triggering the synchronous update of the metabases may ensure that the metabase on the current device records latest information about the device that accesses the target file last time in devices in the file system and a latest connection record.

The current device determines, based on updated metabases, the device that accesses the target file last time, the device in which the file is located, and the connection record.

In a possible implementation, the step of determining whether the user has the read/write permission for the target file may also be completed in another authentication manner. For example, after receiving the instruction sent by the first device, the second device, or the third device, the metabase of the device may return an instruction that triggers the first device, the second device, or the third device to perform user-level permission check on a display interface of the device, for example, cryptographic check, fingerprint check, or facial recognition check. After the check succeeds, the first device, the second device, or the third device sends an instruction including check success information to a respective metabase. After receiving the instruction including the check success information, the metabase triggers the metabases of the plurality of devices of the file system to perform synchronous update. The current device may determine, based on the updated metabases, the device that accesses the target file last time, the device in which the file is located, and the connection record.

In this manner, when another user has no read/write permission for the target file, the target file is not displayed on a device used by the another user, so that data security can be improved.

Based on the determined device in which the file is located and the determined device that accesses the target file last time, in steps S22 and S23, the current device may obtain the file data of the target file and complete connected display on the display interface of the current device. Based on application scenarios in which the current device, the device that accesses the target file last time, and the device in which the file is located are the same or different, in steps S22 and S23, obtaining the file data of the target file and completing the connected display may include a plurality of specific implementations. With reference to FIG. 5a, FIG. 5b, FIG. 6, FIG. 7a, FIG. 7b, FIG. 8a-1 and FIG. 8a-2, FIG. 8b, FIG. 9a-1 and FIG. 9a-2, FIG. 9b-1 and FIG. 9b-2, FIG. 10a, FIG. 10b, FIG. 11a, and FIG. 11b, the following describes a procedure of a file connection method according to an embodiment of this application in several application scenarios.

In a possible implementation, when the current device, the device that accesses the target file last time, and the device in which the file is located are the same, In step S22, that the current device obtains file data of the target file from at least one of the device that accesses the target file last time and the device in which the file is located includes:

The current device loads the written cache file and the read cache file in a memory space; and in step S23, that the current device displays to-be-displayed content based on at least one of the connection record of the target file and the file data of the target file includes:

When the written cache file is empty, the current device determines an offset location of the to-be-displayed content relative to the target file based on the connection record, and displays the to-be-displayed content based on the offset location and the read cache file in the memory space; or when the written cache file is not empty, the current device determines an offset location of the to-be-displayed content relative to the target file based on the written cache file, and displays the to-be-displayed content based on the offset location and the read cache file and the written cache file in the memory space.

Figure 5A:
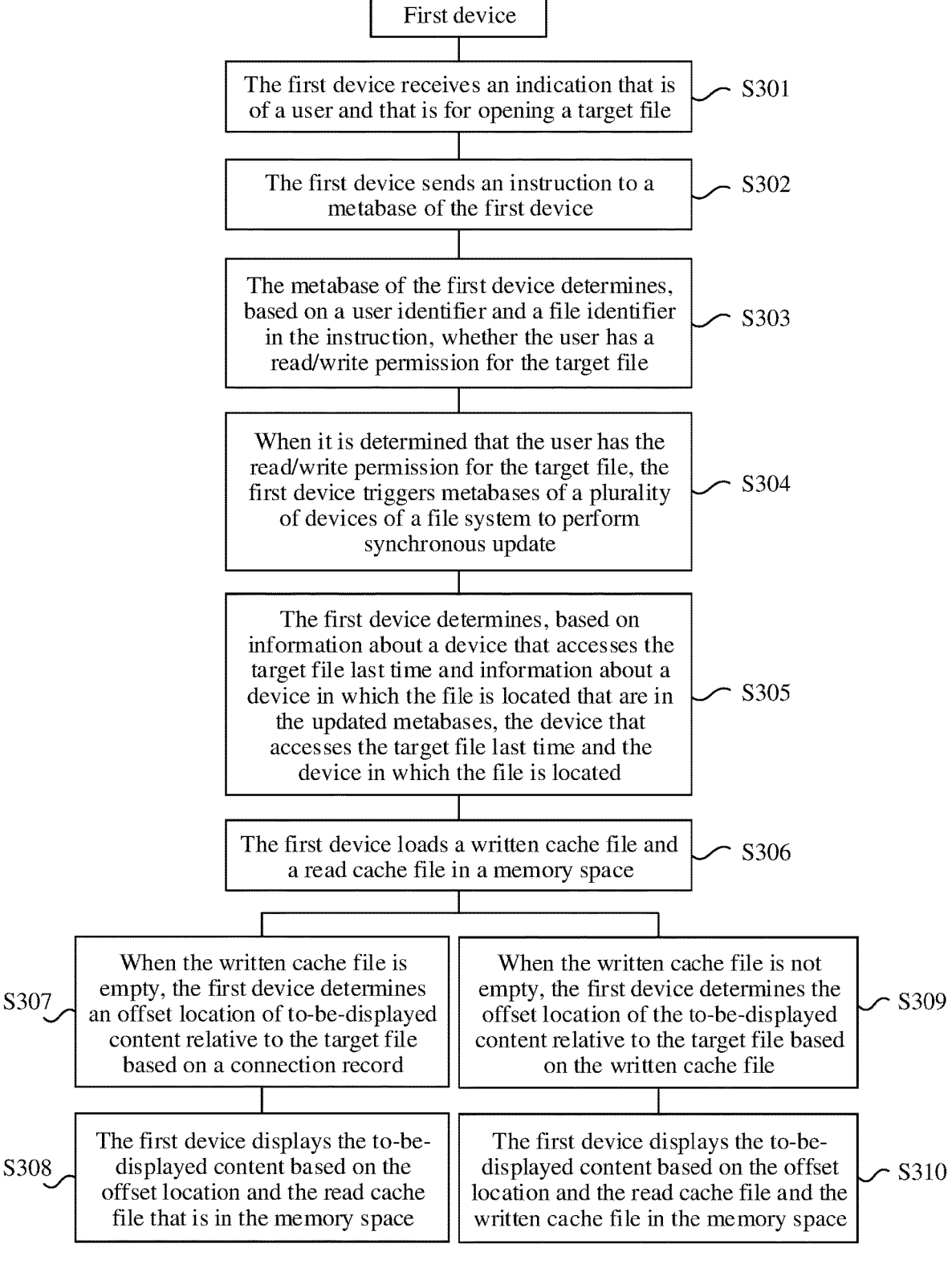
FIG. 5*a* is a schematic diagram of a file connection method in an example application scenario according to an embodiment of this application.
Figure 5B:
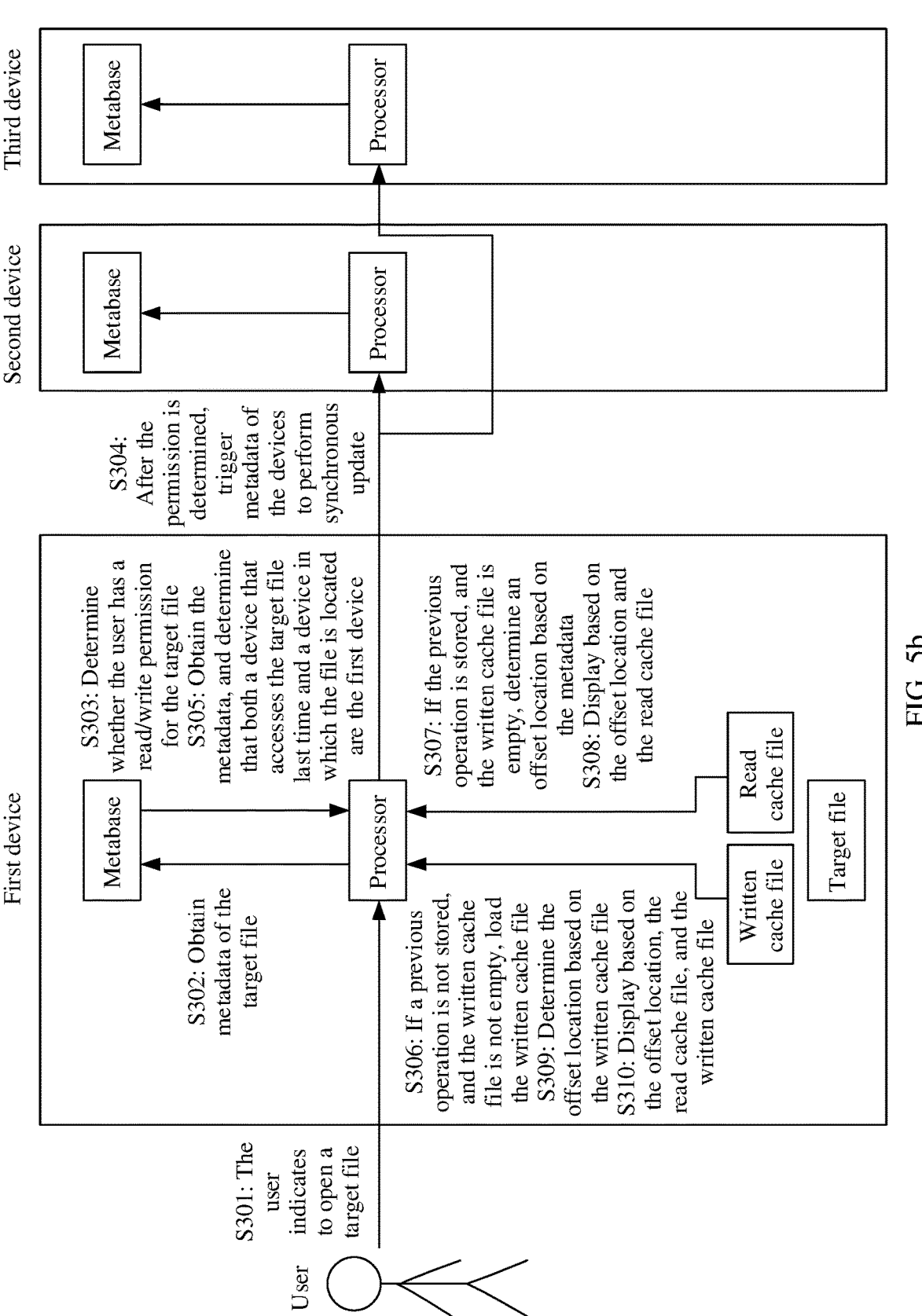
FIG. 5*b* is a schematic diagram of a file connection method in an example application scenario according to an embodiment of this application.

For example, the current device may be the first device, and the target file is stored in the first device. In an example application scenario, the user uses different application software on the first device that stores the target file, and opens a same file (the target file) twice in sequence. When the target file is opened for the second time, an operation location (for example, a read location or an edit location) of the target file when the target file is opened for the first time is directly displayed. In this case, the current device, the device that accesses the target file last time, and the device in which the file is located are the same and are all the first device. FIG. 5a and FIG. 5b each show a working procedure of the first device when the user opens the target file for the second time in the application scenario.

When the first device accesses the target file, all or some of content of the read target file may be retained in the read cache file, and an operation type (for example, insertion, deletion, or replacement) of an operation performed on the target file, and a location and content of the operation (for example, a location and content of insertion, a location and content of deletion, a location of replacement, content before replacement, and content after replacement) may be retained in the written cache file. If the first device stores the target file after operating the target file, content of the target file is updated (for example, the read cache file is updated) with the content in the written cache file, and a new target file is formed for storage (for example, storage into a memory or a hard disk), and the written cache file is cleared at the same time. If the target file is not stored after being operated, the operation type, the operation location, and the operation content are still retained in the written cache file.

Table 2 shows an example of a data structure of a read cache file according to an embodiment of this application.

TABLE 2

| File identification | Offset | Size | Cache content | Cache version number (which may be a modification time) | ... |
|---|---|---|---|---|---|

As shown in Table 2, the read cache file includes:

File identifier, used to distinguish between different files. A specified file may be found based on the file identifier.

Offset, used to determine an operation location of a latest read operation performed by the user on the file. If the file corresponding to the file identifier is a relatively large file (for example, a video file), in a process of reading the file and obtaining the read cache file, a part of the video file, for example, a part determined based on the offset, may be first obtained.

Size, used to determine a data size of the read cache file.

Cache content, used to record read file content data.

Cache version number, which may be a file modification time. For example, if the read cache file is obtained by reading the file data of the target file, the cache version number represents the file modification time of the target file.

Table 3 shows an example of a data structure of a written cache file according to an embodiment of this application.

TABLE 3

| File identification | Offset | Size | Cache content | ... |
|---|---|---|---|---|

As shown in Table 3, the written cache file includes:

File identifier, used to distinguish between different files. A specified file may be found based on the file identifier.

Offset, used to determine an operation location of a latest editing operation performed by the user on the file.

Size, used to display a data size of the written cache file.

Cache content, used to record an operation location, an operation type, and operation content of an editing operation performed on the file.

Based on FIG. 5*a* and FIG. 5*b*, in step S301, the first device receives the indication that is of the user and that is for opening the target file.

In step S302, the first device sends an instruction to the metabase of the first device, where the instruction includes the user identifier of the user and the file identifier of the target file, the instruction is used to obtain the metadata that is of the target file and that is stored in the metabase of the first device, and the metadata may include the connection record of the target file, the information about the device that accesses the target file last time (the first device in this case), and the information about the device in which the file is located (the first device in this case).

In step S303, the metabase of the first device determines, based on the user identifier and the file identifier in the instruction, whether the user has the read/write permission for the target file.

In step S304, when it is determined that the user has the read/write permission for the target file, the first device triggers the metabases of the plurality of devices of the file system to perform synchronous update, so that the metadata that is of the target file and that is stored in each device is synchronously updated to a latest version. Triggering the synchronous update of the metabases may ensure that the metadata on the first device records a latest device access record of each device in the file system for the target file and a latest connection record.

In step S305, the first device determines, based on the information about the device that accesses the target file last time and the information about the device in which the file is located that are in the updated metabases, the device that accesses the target file last time and the device in which the file is located (both are the first device in this application scenario).

In step S306, the first device loads the written cache file and the read cache file in a memory space.

For example, when the current device, the device that accesses the target file last time, and the device in which the file is located are all the first device, the written cache file and the read cache file in the memory space of the first device are loaded. If the target file is stored when the first device accesses the target file last time, the written cache file is empty. If the target file is not stored when the first device accesses the target file last time (for example, the target file is edited by using WORD for the first time and is not stored, and the target file is opened by using WPS for the second time), in this case, the written cache file is not empty, and the written cache file records the type, the location, and the content of the operation performed on the target file when the target file is accessed last time. When the current device and the device in which the file is located are the same (both are the first device), the read cache file is file data that is of the target file and that is read from the hard disk into the memory space. In a possible implementation, there may not be the read cache file in the memory space. In this case, file content in the hard disk may be first read, and the file content is stored in the memory space in a form of the read cache file.

In step S307, when the written cache file is empty, the first device determines an offset location of the to-be-displayed content relative to the target file based on the connection record. The connection record may be obtained by using the metabase of the first device, and the offset location is associated with the operation location when the target file is stored last time. For example, if the operation when the target file is stored last time is an insertion operation, the offset location is an insertion location in the file (for example, represented by a file byte number at which an insertion cursor is located).

In step S308, the first device displays the to-be-displayed content based on the offset location and the read cache file that is in the memory space.

For example, the offset location may be located in the read cache file, and then content near the offset location in the read cache file is used for display. For example, a displayed page may include text content near the location at which the insertion cursor of a latest insertion operation is located.

In step S309, when the written cache file is not empty, the first device determines the offset location of the to-be-displayed content relative to the target file based on the written cache file. Cache content of the written cache file includes an operation type and operation content of an editing operation performed at the offset location of the target file.

In step S310, the first device displays the to-be-displayed content based on the offset location and the read cache file and the written cache file in the memory space.

In a possible implementation, a corresponding location may be found in the read cache file based on the operation location recorded in the written cache file, so that the operation type and the operation content that are of the operation performed at the operation location and that are recorded in the written cache file can be used at the corresponding location in the read cache file, thereby obtaining the file content after the previous operation, and then the operation location of the editing operation performed last time by the user on the file, for example, the location of the cursor, may be determined based on the offset in the written cache. After the content of the file is combined with the location of the cursor, the to-be-displayed content is obtained, and the to-be-displayed content is the same as the content displayed on the display interface after the user opens the file last time.

FIG. 6 is an example flowchart of step S310 according to an embodiment of this application. Based on FIG. 6, in step S310, the cache content of the read cache file is associated with the cache content of the written cache file, so that the offset location in the written cache file can be located in the cache content of the read cache file. Steps of combining the read cache file and the written cache file for display are as follows:

In step S401, based on the cache content in the written cache file, the operation location of the operation performed on the target file when the target file is accessed last time, and the operation type and operation content that correspond to each operation location are determined.

In step S402, the corresponding operation location is found in the read cache file, and the to-be-displayed content is obtained based on the cache content of the read cache file and the operation type and the operation content that correspond to each operation location.

For example, it is determined by using the written cache file that a number is inserted at a first location. The read cache file may be cache content including file content at the first location and file content before and after the first location. Combining the read cache file with the written cache file may be in the following form: After a number is inserted at the first location of the read cache file, file content data after the first location of the read cache file is sequentially delayed by a location of a size occupied by the number, to determine the to-be-displayed content.

In step S403, the to-be-displayed content is displayed on a display interface of application software. Using the foregoing number insertion as an example, in the displayed content, the cursor may be located at the location at which the number is inserted.

In a possible implementation, when the written cache is not empty, the first device may alternatively send an instruction to forcibly apply the written cache file to the target file stored in the first device, to change file content of the target file. When the first device opens the target file for the second time for display, the first device determines the offset location based on the received written cache file, reads the file content that is of the target file and that has changed, and stores the file content as the read cache file into the memory. The first device may use the read cache file to display, and locate the offset location on the display interface in a form of a cursor or the like.

In this manner, the file may implement cross-application connection on the device that stores the file, to improve an application scope of the file connection method.

In a possible implementation, when the current device is the same as the device that accesses the target file last time, and is different from the device in which the file is located, in step S22, that the current device obtains file data of the target file from at least one of the device that accesses the target file last time and the device in which the file is located includes:

The current device loads the written cache file and the read cache file in a cache space.

In step S23, that the current device displays to-be-displayed content based on at least one of the connection record of the target file and the file data of the target file includes:

When the written cache file is empty, the current device determines an offset location of the to-be-displayed content relative to the target file based on the connection record, and displays the to-be-displayed content based on the offset location and the read cache file in the cache space; or when the written cache file is not empty, the current device determines an offset location of the to-be-displayed content relative to the target file based on the written cache file, and displays the to-be-displayed content based on the offset location and the read cache file and the written cache file in the cache space.

In an example application scenario, the target file is stored in the first device. The user uses different application software on the second device to open a same file (the target file) twice in sequence. When the target file is opened for the second time, an operation location (for example, a read location or an edit location) of the target file when the target file is opened for the first time is directly displayed. In this case, the device in which the file is located may be the first device, and the current device and the device that accesses the target file last time may be the same and both are the second device. By using FIG. 7a and FIG. 7b as an example, the following describes a working procedure of the second device when the user opens the target file for the second time in the application scenario.

When accessing the target file stored in the first device, the second device may store all or some of file content of the read target file into the read cache file, and store an operation type, an operation location, and operation content of the operation on the target file into the written cache file.

Figure 7A:
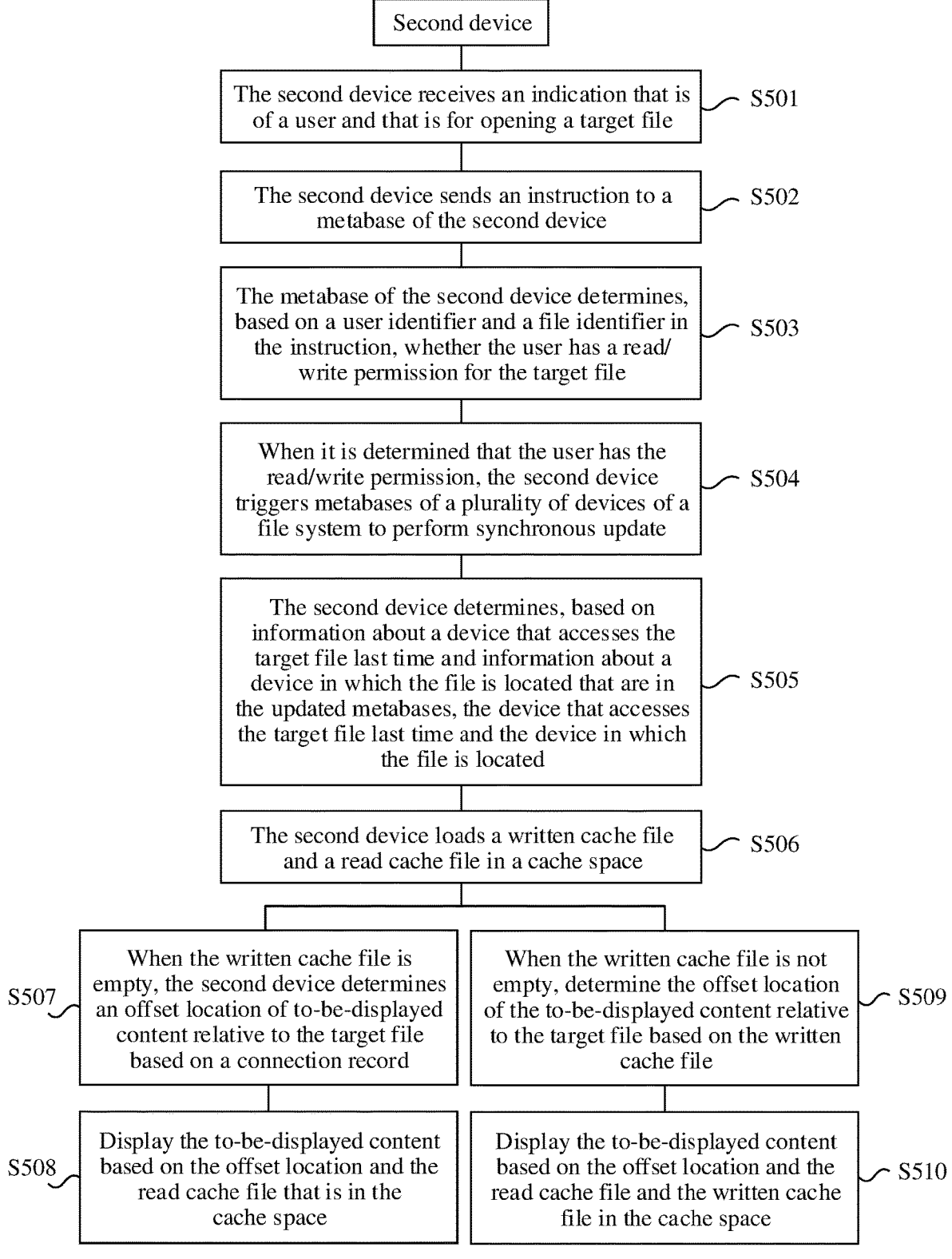
FIG. 7*a* is a schematic diagram of a file connection method in another example application scenario according to an embodiment of this application.
Figure 7B:
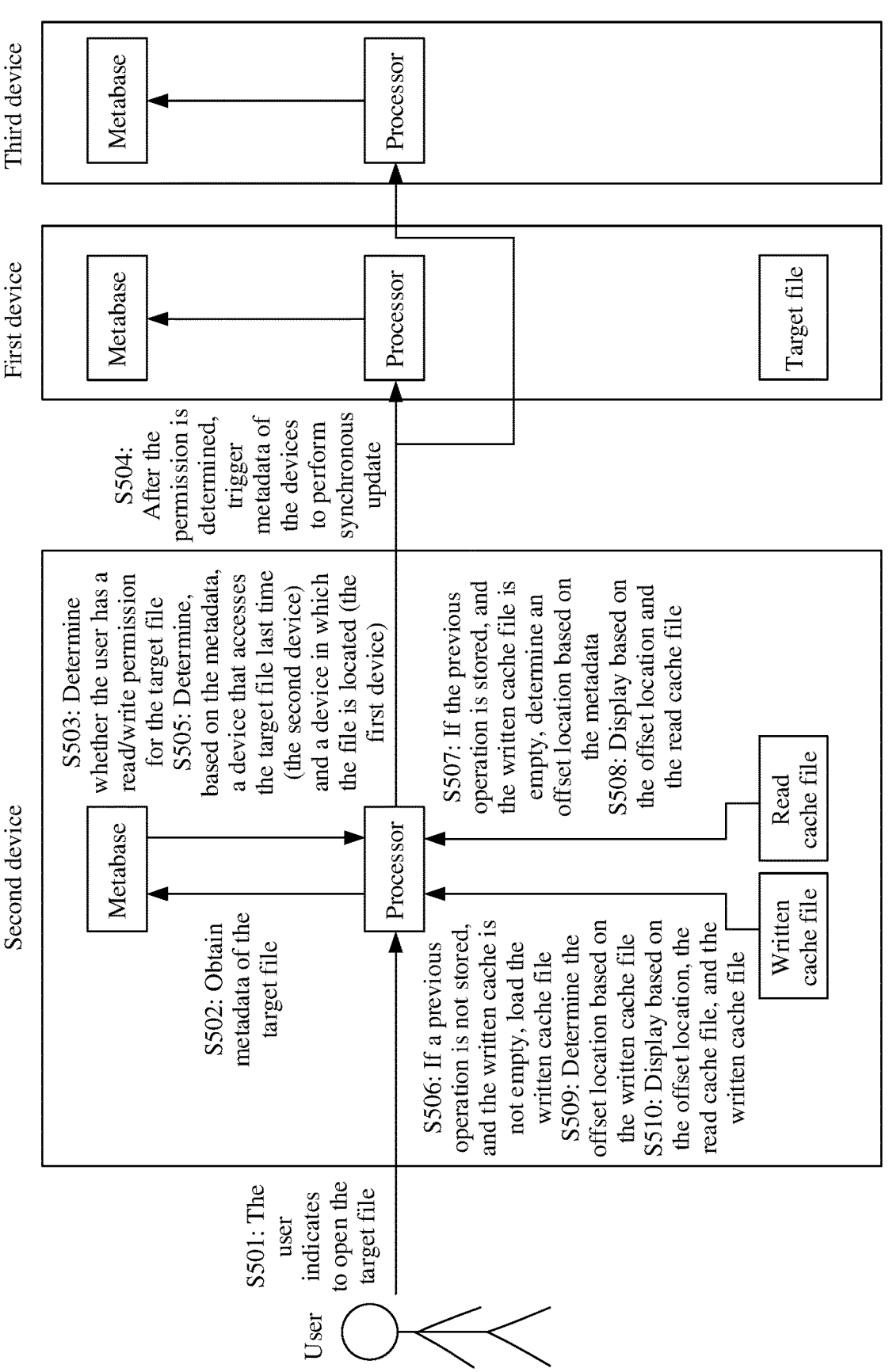
FIG. 7*b* is a schematic diagram of a file connection method in another example application scenario according to an embodiment of this application.

Based on FIG. 7a and FIG. 7b, in step S501, the second device receives the indication that is of the user and that is for opening the target file.

In step S502, the second device sends an instruction to the metabase of the second device, where the instruction includes the user identifier of the user and the file identifier of the target file, the instruction is used to obtain the metadata that is of the target file and that is stored in the metabase of the second device, and the metadata includes at least the connection record of the target file, the information about the device that accesses the target file last time (the second device in this case), and the information about the device in which the file is located (the first device in this case).

In step S503, the metabase of the second device determines, based on the user identifier and the file identifier in the instruction, whether the user has the read/write permission for the target file.

In step S504, when it is determined that the user has the read/write permission, the second device triggers the metabases of the plurality of devices of the file system to perform synchronous update, so that the metadata that is of the target file and that is stored in each device is synchronously updated to a latest version. Triggering the synchronous update of the metabases may ensure that the metadata on the second device records a latest device access record of each device in the file system for the target file and a latest connection record.

In step S505, the second device determines, based on the information about the device that accesses the target file last time and the information about the device in which the file is located that are in the updated metabases, the device that accesses the target file last time and the device in which the file is located (in this application scenario, the device that accesses the target file last time is the second device, and the file in which the file is located is the first device).

In step S506, the second device loads the written cache file and the read cache file in a cache space.

For example, when the current device and the device that accesses the target file last time are the second device, and the device in which the file is located is the first device, the second device loads the written cache file and the read cache file in the cache space. If the target file is stored when the second device accesses the target file last time, the written cache file is empty. If the target file is not stored when the second device accesses the target file last time (for example, the target file is edited by using WORD for the first time and is not stored, and the target file is opened by using WPS for the second time), in this case, the written cache file is not empty, and the written cache file records the type, the location, and the content of the operation performed on the target file when the target file is accessed last time. When the current device is the same as the device that accesses the target file last time (both are the second device), the read cache file is file data that is of the target file and that is in the cache space of the second device. In a possible implementation, there may not be the read cache file in the cache space. In this case, a read cache obtaining request may be directly sent to the device in which the file is located (the first device), to obtain the read cache file in the cache space of the first device. The read cache file of the cache space of the first device may be file content that is in the hard disk and that is read by the first device, and is stored in the memory space in a form of the read cache file. After obtaining the read cache file, the second device may store the read cache file into the cache space of the second device.

In step S507, when the written cache file is empty, the second device determines an offset location of the to-be-displayed content relative to the target file based on the connection record. The connection record may be obtained by using the metabase of the second device, and the offset location is associated with the operation location when the target file is stored last time. For example, if the operation when the target file is stored last time is an insertion operation, the offset location is an insertion location in the file (for example, represented by a file byte number at which an insertion cursor is located).

In step S508, the to-be-displayed content is displayed based on the offset location and the read cache file that is in the cache space.

For example, the offset location may be located in the read cache file, and then content near the offset location in the read cache file is used for display. For example, a displayed page may include text content near the location at which the insertion cursor of a latest insertion operation is located.

In step S509, when the written cache file is not empty, the offset location of the to-be-displayed content relative to the target file is determined based on the written cache file.

In step S510, the to-be-displayed content is displayed based on the offset location and the read cache file and the written cache file in the cache space.

For an example procedure of step S510 in this embodiment of this application, refer to the procedure in FIG. 6.

In this manner, the file may implement cross-application connection on any one of devices in the file system other than the device that stores the file, to improve an application scope of the file connection method.

In a possible implementation, when the current device is the same as the device in which the file is located, and is different from the device that accesses the target file last time, in step S22, that the current device obtains file data of the target file from at least one of the device that accesses the target file last time and the device in which the file is located includes:

The current device sends a written cache file obtaining request to the device that accesses the target file last time;

the current device receives the returned written cache file; and the current device loads the read cache file in a memory space; and in step S23, that the current device displays to-be-displayed content based on at least one of the connection record of the target file and the file data of the target file includes:

When the written cache file is empty, the current device determines an offset location of the to-be-displayed content relative to the target file based on the connection record, and displays the to-be-displayed content based on the offset location and the read cache file in the memory space; or when the written cache file is not empty, the current device determines an offset location of the to-be-displayed content relative to the target file based on the written cache file, and displays the to-be-displayed content based on the offset location and the read cache file and the written cache file in the memory space.

In an example application scenario, the target file is stored in the first device. The user uses application software on a device other than the first device (for example, the second device in this example application scenario) to open the target file, and then uses application software on the first device to open the same file. The application software used on the second device may be different from that used on the first device. When the target file is opened for the second time, an operation location (for example, a read location or an edit location) of the target file when the target file is opened for the first time is directly displayed. In this case, the current device and the device in which the file is located may be the same and the first device, and the device that accesses the target file last time may be the second device. By using FIG. 8a-1 and FIG. 8a-2 and FIG. 8b as an example, the following describes a working procedure of the first device when the user opens the target file for the second time in the application scenario.

Based on FIG. 8a-1 and FIG. 8a-2 and FIG. 8b, in step S601, the first device receives the indication that is of the user and that is for opening the target file.

In step S602, the first device sends an instruction to the metabase of the first device, where the instruction includes the user identifier of the user and the file identifier of the target file, the instruction is used to obtain the metadata that is of the target file and that is stored in the metabase of the first device, and the metadata includes at least the connection record of the target file, the information about the device that accesses the target file last time (the second device in this case), and the information about the device in which the file is located (the first device in this case).

In step S603, the metabase of the first device determines, based on the user identifier and the file identifier in the instruction, whether the user has the read/write permission for the target file.

In step S604, when it is determined that the user has the read/write permission, the metabases of the plurality of devices of the file system are triggered to perform synchronous update, so that the metadata that is of the target file and that is stored in each device is synchronously updated to a latest version. Triggering the synchronous update of the metabases may ensure that the metadata on the first device records a latest device access record of each device in the file system for the target file and a latest connection record.

In step S605, the first device determines, based on the information about the device that accesses the target file last time and the information about the device in which the file is located that are in the updated metabases, the device that accesses the target file last time and the device in which the file is located (in this application scenario, the device that accesses the target file last time is the second device, and the file in which the file is located is the first device).

In step S606, the first device sends a written cache file obtaining request to the device that accesses the target file last time (the second device).

In step S607, the first device receives a returned written cache file.

In step S608, the first device loads the read cache file in the memory space.

For example, when the current device and the device in which the file is located are the first device, and the device that accesses the target file last time is the second device, the written cache file of the target file may be obtained in a manner of transmitting data information between devices. If the target file is stored when the second device accesses the target file last time, the written cache file is empty. If the target file is not stored when the second device accesses the target file last time (for example, the target file is edited by using WORD for the first time on the second device and is not stored, and the target file is opened by using WPS for the second time on the first device), in this case, the written cache file is not empty, and the written cache file records the type, the location, and the content of the operation performed on the target file when the target file is accessed last time. When the current device and the device in which the file is located are the same (both are the first device), the read cache file is file data that is of the target file and that is read from the hard disk into the memory space. In a possible implementation, there may not be the read cache file in the memory space. In this case, file content in the hard disk may be first read, and the file content is stored in the memory space in a form of the read cache file.

In step S609, when the written cache file is empty, the first device determines an offset location of the to-be-displayed content relative to the target file based on the connection record. The connection record may be obtained by using the metabase of the first device, and the offset location is associated with the operation location when the target file is stored last time. For example, if the operation when the target file is stored last time is an insertion operation, the offset location is an insertion location in the file (for example, represented by a file byte number at which an insertion cursor is located).

In step S610, the to-be-displayed content is displayed based on the offset location and the read cache file in the memory space.

For example, the offset location may be located in the read cache file, and then content near the offset location in the read cache file is used for display. For example, a displayed page may include text content near the location at which the insertion cursor of a latest insertion operation is located.

In step S611, when the written cache file is not empty, the first device determines the offset location of the to-be-displayed content relative to the file based on the written cache file.

In step S612, the to-be-displayed content is displayed based on the offset location and the read cache file and the written cache file in the memory space.

For an example procedure of step S612 in this embodiment of this application, refer to the procedure in FIG. 6.

In a possible implementation, when the to-be-displayed content of the target file is displayed, the device that accesses the target file last time is updated to the current device. For example, in this application scenario, in step S21, the device that accesses the target file last time and that is determined based on the metabase of the second device is the second device. In this case, in step S23, after the to-be-displayed content is displayed on the first device, in the metadata that is of the target file and that is stored in the second device, the information about the device that accesses the target file last time may be updated to the first device. In this way, when a device (for example, the third device) performs connected access to the target file next time, the device that accesses the target file last time and that is determined on the third device is the first device, and the third device may obtain the written cache file information from the first device.

In this manner, the file may implement cross-device and cross-application connection on the device that stores the file, to improve an application scope of the file connection method.

In a possible implementation, when the current device, the device that accesses the target file last time, and the device in which the file is located are all different from each other, in step S22, that the current device obtains file data of the target file from at least one of the device that accesses the target file last time and the device in which the file is located includes:

The current device sends a written cache file obtaining request to the device that accesses the target file last time;

the current device receives the returned written cache file;

the current device sends a read cache file obtaining request to a device with a higher transmission speed in the device that accesses the target file last time and the device in which the file is located; and the current device receives the returned read cache file.

In step S23, that the current device displays to-be-displayed content based on at least one of the connection record of the target file and the file data of the target file includes:

When the written cache file is empty, the current device determines an offset location of the to-be-displayed content relative to the target file based on the connection record, and displays the to-be-displayed content based on the offset location and the received read cache file; or when the written cache file is not empty, the current device determines an offset location of the to-be-displayed content relative to the target file based on the written cache file, and displays the to-be-displayed content based on the offset location and the received read cache file and written cache file.

In an example application scenario, the target file is stored in the first device. The user uses different application software on the second device and the third device to open a same file (the target file) twice in sequence. When the target file is opened for the second time, an operation location (for example, a read location or an edit location) of the target file when the target file is opened for the first time is directly displayed. In this case, the device in which the file is located may be the first device, the device that accesses the target file last time may be the second device, and the current device may be the third device. By using FIG. 9a-1 and FIG. 9a-2 and FIG. 9b-1 and FIG. 9b-2 as an example, the following describes an example working procedure of the third device when the user opens the target file for the second time in the application scenario.

Based on FIG. 9a-1 and FIG. 9a-2 and FIG. 9b-1 and FIG. 9b-2, in step S701, the third device receives the indication that is of the user and that is for opening the target file.

In step S702, the third device sends an instruction to the metabase of the third device, where the instruction includes the user identifier of the user and the file identifier of the target file, the instruction is used to obtain the metadata that is of the target file and that is stored in the metabase of the third device, and the metadata includes at least the connection record of the target file, the information about the device that accesses the target file last time (the second device in this case), and the information about the device in which the file is located (the first device in this case).

In step S703, the metabase of the third device determines, based on the user identifier and the file identifier in the instruction, whether the user has the read/write permission for the target file.

In step S704, when it is determined that the user has the read/write permission for the target file, the third device triggers the metabases of the plurality of devices of the file system to perform synchronous update once, so that the metadata that is of the target file and that is stored in each device is synchronously updated to a latest version. Triggering the synchronous update of the metabases may ensure that the metadata on the third device records a latest device access record of each device in the file system for the target file and a latest connection record.

In step S705, the third device determines, based on the information about the device that accesses the target file last time and the information about the device in which the file is located that are in the updated metabases, the device that accesses the target file last time and the device in which the file is located (in this application scenario, the device that accesses the target file last time is the second device, and the file in which the file is located is the first device).

In step S706, the third device sends a written cache file obtaining request to the device that accesses the target file last time (the second device). In FIG. 9*a*-1 and FIG. 9*a*-2 and FIG. 9*b*-1 and FIG. 9*b*-2, the device that accesses the target file last time (the second device) is different from the device in which the file is located (the first device).

In step S707, a returned written cache file is received.

For example, when the current device and the device in which the file is located are the first device, and the device that accesses the target file last time is the second device, the written cache file and the read cache file of the target file may be obtained in a manner of transmitting data information between devices. If the target file is stored when the second device accesses the target file last time, the written cache file is empty. If the target file is not stored when the second device accesses the target file last time (for example, the target file is edited by using WORD for the first time on the second device and is not stored, and the target file is opened by using WPS for the second time on the third device), in this case, the written cache file is not empty, and the written cache file records the type, the location, and the content of the operation performed on the target file when the target file is accessed last time.

In step S708, when the written cache file is empty, the third device determines an offset location of the to-be-displayed content relative to the target file based on the connection record; or if the written cache file is not empty, step S717 is performed (refer to FIG. 9*b*-1 and FIG. 9*b*-2). The third device determines the offset location of the to-be-displayed content relative to the file based on the written cache file.

In step S709, the third device sends an instruction to indicate the device in which the file is located (the first device) to return data of a preset size, where the third device records first time information of sending the instruction.

In step S710, the third device receives data returned by the device in which the file is located. The third device records second time information of receiving the returned data. The third device may determine, based on the first time information and the second time information, a time of data transmission from the third device to the device in which the file is located (the first device).

In step S711, the third device sends an instruction to indicate the device that accesses the target file last time (the second device) to return data of a preset size, where the third device records third time information of sending the instruction.

In step S712, the third device receives data returned by the device that accesses the target file last time. The third device records fourth time information of receiving the returned data. The third device may determine, based on the third time information and the fourth time information, a time of data transmission from the third device to the device that accesses the target file last time (the second device).

In step S713, the third device determines, based on the time from sending the instruction to the device in which the file is located (the first device) to receiving the returned data and the time from sending the instruction to the device that accesses the target file last time (the second device) to receiving the returned data, the device with a higher transmission speed, that is, the device with a shorter data transmission time, in the device in which the file is located (the first device) and the device that accesses the target file last time (the second device). In an example working procedure in FIG. 9*a*-1 and FIG. 9*a*-2, the device with a higher transmission speed is the device that accesses the target file last time (the second device).

In step S714, the third device sends a read cache file obtaining request to the device with a higher transmission speed (the device that accesses the target file last time, namely, the second device) in the device that accesses the target file last time and the device in which the file is located.

In step S715, the third device receives a returned read cache file. In a possible implementation, there may not be the read cache file in the cache space of the device that accesses the target file last time (the second device) (for example, the second device clears the cache space). In addition, the device that accesses the target file last time (the second device) is not the device in which the file is located (the first device). In this case, the device that accesses the target file last time (the second device) may return an empty read cache file. When the received read cache file is empty, the third device may send the read cache file obtaining request to the device in which the file is located (the first device). The memory space of the device in which the file is located (the first device) stores a read cache file, and the read cache file is file data that is of the target file and that is read from the hard disk into the memory space. In a possible implementation, there may not be the read cache file in the memory space of the first device. In this case, the first device may first read file content in the hard disk, store the file content in the memory space in a form of the read cache file, and then return the read cache file to the third device. After receiving the read cache file and the read cache file is not empty, the third device stores the read cache file into the cache space of the third device, and then uses the received read cache file for display.

In step S716, the to-be-displayed content is displayed based on the offset location and the received read cache file.

In step S717 (refer to FIG. 9*b*-1 and FIG. 9*b*-2), when the written cache file is not empty, the third device determines the offset location of the to-be-displayed content relative to the file based on the written cache file, and performs the foregoing steps S709 to S715.

In step S718 (refer to FIG. 9*b*-1 and FIG. 9*b*-2), the to-be-displayed content is displayed based on the offset location and the received read cache file and written cache file.

For an example procedure of step S718 in this embodiment of this application, refer to the procedure in FIG. 6.

In a possible implementation, the read cache file obtaining request sent by the third device to the device with a higher transmission speed (the device that accesses the target file last time) in this application scenario may include, for example, location information of content data of the read cache file that needs to be obtained in the target file (the target file), where the location information may be determined based on the written cache file. For example, the written cache file may include a plurality of operation positions, and it may be determined that a start location of the read cache file is at least earlier than the first operation location in the plurality of operation positions, and it may be determined that an end location of the read cache file is at least later than the last operation location in the plurality of operation positions.

In a possible implementation, a data amount of the target file may be relatively small. For example, the target file may be a document type file. In this case, all content of the target file may be transmitted between the plurality of devices in a form of the read cache file. In a possible implementation, a data amount of the target file may be relatively large. For example, the target file is a video type file. In this case, an amount of data that is of the read cache file and that is transmitted once may be preset.

For example, a read cache file whose start location is at least earlier than the first operation location in the plurality of operation positions and whose end location is at least later than the last operation location in the plurality of operation positions is determined as a first read cache file. After the current device receives the first read cache file, display of the to-be-displayed content is completed, for example, play continues from a play location of the device that accesses the target file last time. At the same time, the current device re-sends a read cache file obtaining request to the device that accesses the target file last time or the device in which the file is located. The read cache request includes location information of a second read cache file that needs to be obtained. In this application scenario, a start location of the second read cache file may be the same as the end location of the first read cache file, and an end location of the second read cache file may be, for example, an end location that makes the second read cache file have a data amount of a preset size.

For example, the preset size of the read cache file transmitted once may be 40 M, the target file is 200 M in total, and the end location of the first read cache file is at 10 M of the target file. The start location of the second read cache file may be, for example, at 10 M of the target file, and the end location may be, for example, at 50 M of the target file.

In a possible implementation, the device that accesses the target file last time and the device in which the file is located in FIG. 9a-1 and FIG. 9a-2 and FIG. 9b-1 and FIG. 9b-2 may alternatively be the same (for example, both are the first device). In this case, the read cache file and the written cache file necessarily come from the first device, and the steps of sending the instructions respectively to the device that accesses the target file last time and the device in which the file is located to probe the transmission speeds (steps S709 to S715) may be omitted. To be specific, when the written cache file is empty, after determining the offset location of the to-be-displayed content relative to the target file based on the connection record, the third device directly sends the read cache file obtaining request to the first device. Alternatively, when the written cache file is not empty, after determining the offset location of the to-be-displayed content relative to the target file based on the written cache file, the third device directly sends the read cache file obtaining request to the first device. In a possible implementation, the instruction for obtaining the read cache file may alternatively be combined with the instruction for obtaining the written cache file. For example, the third device sends a request to the first device, where the request is used to enable the first device to send the read cache file and the written cache file to the third device, and the first device returns the read cache file and the written cache file to the third device simultaneously based on the request.

In this manner, the file may implement cross-device and cross-application connection on any device of the file system, to improve an application scope of the file connection method.

In a possible implementation, in an example application scenario, the target file is stored in the first device. After the second device completes connected display of the file content of the target file on the display interface of the application software, the user may edit the displayed file content on the display interface of the second device, and the content edited by the user in current access is stored into the cache space of the second device in a form of the written cache file. If a new device (for example, the third device) opens the target file at this time, the third device may determine, based on the information about the device that accesses the target file last time (that is, the device access record) in the metadata, that the second device operates the target file last time, and send the written cache file obtaining request to the second device. When receiving the written cache obtaining request from the third device, the second device may return the written cache file in the cache space to the third device. If a storage indication of the user is received on the second device at this time, the second device may return the written cache file in the cache space to the first device, and update the connection record that is of the target file and that is in the metabase of the second device.

Figure 10A:
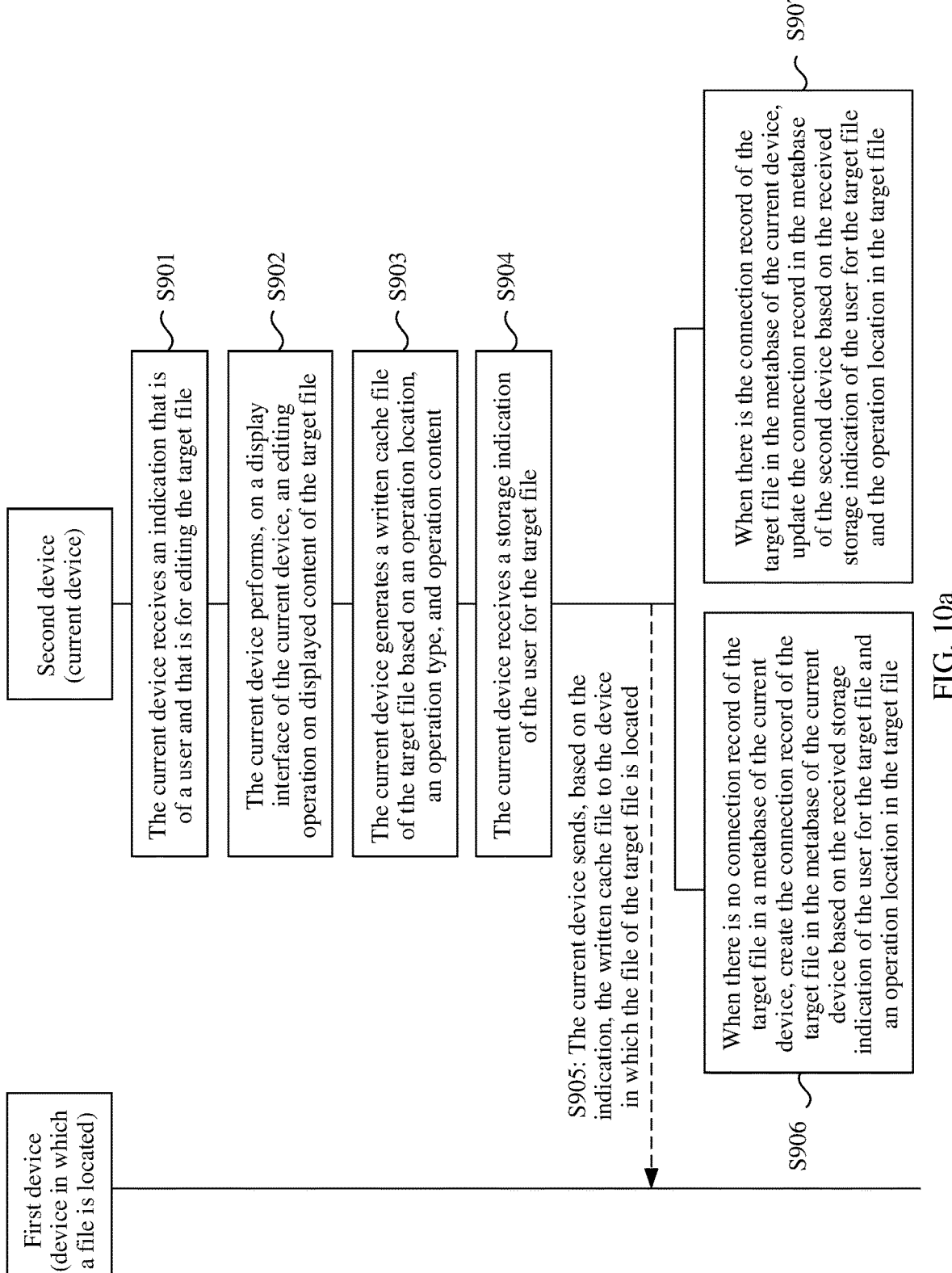
FIG. 10*a* is a schematic diagram of a file connection method in another example application scenario according to an embodiment of this application.
Figure 10B:
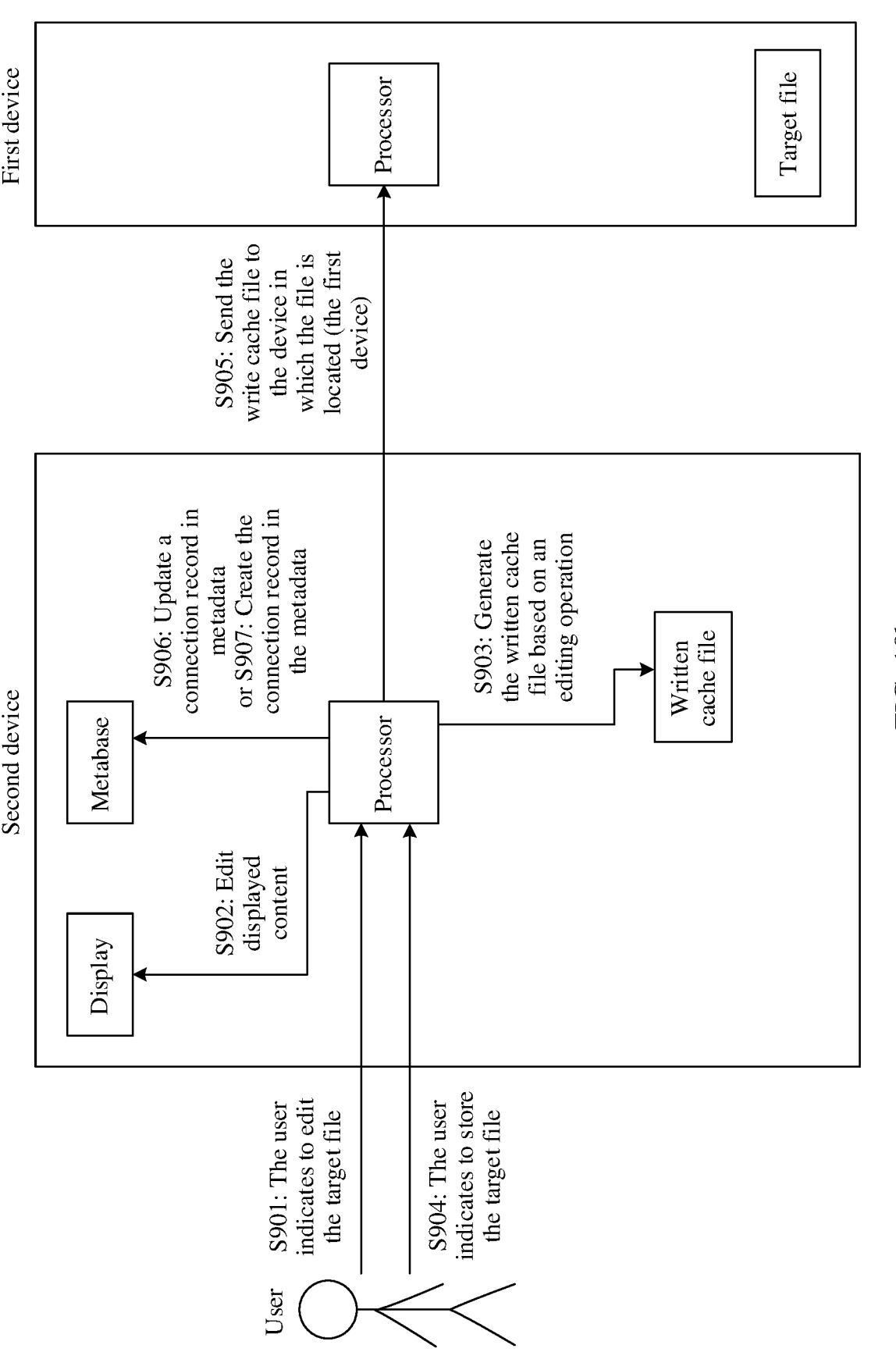
FIG. 10*b* is a schematic diagram of a file connection method in another example application scenario according to an embodiment of this application.

By using FIG. 10a and FIG. 10b as an example, the following describes a working procedure in which the current device (the second device) performs an editing operation on the target file and receives the storage indication after completing connected display of the target file in this application scenario.

Based on FIG. 10a and FIG. 10b, when the current device is different from the device in which the file of the target file is located, in step S901, the current device receives an indication that is of the user and that is for editing the target file.

In step S902, the current device performs the editing operation on displayed content of the target file on the display interface of the current device based on the indication, where a type of the editing operation may include deletion, modification, replacement, and the like performed by the user on the file content.

In step S903, the current device generates the written cache file of the target file based on an operation location, an operation type, and operation content. Because the second device (the current device) is not the device in which the file of the target file is located (the first device), the written cache file is stored in the cache space of the second device. In a possible implementation, if an edit object is a file on which connected display is performed on the second device and that is stored in the second device, the written cache file is stored in the memory space of the second device.

Further, when the user stores the target file, the following steps may be further included:

In step S904, the current device receives the storage indication of the user for the target file.

In step S905, the current device sends, based on the indication, the written cache file to the device in which the file of the target file is located (the first device).

When the written cache file is sent, the written cache file on the second device may be cleared; or, a written cache file may be copied and sent, and the written cache file is retained in the cache space of the second device, so that the target file can still be displayed after the user taps Save on the second device.

In step S906, when there is no connection record of the target file in the metabase of the current device, the connection record of the target file is created in the metabase of the current device based on the received storage indication of the user for the target file and the operation location in the target file; or in step S907, when there is the connection record of the target file in the metabase of the current device, the connection record in the metabase of the second device is updated based on the received storage indication of the user for the target file and the operation location in the target file. In this case, the created connection record or the updated connection record indicates the offset location determined based on the operation location of the latest operation.

In this manner, file edits can be transmitted between devices, so that latest edit content can be displayed during connected display.

Figure 11A:
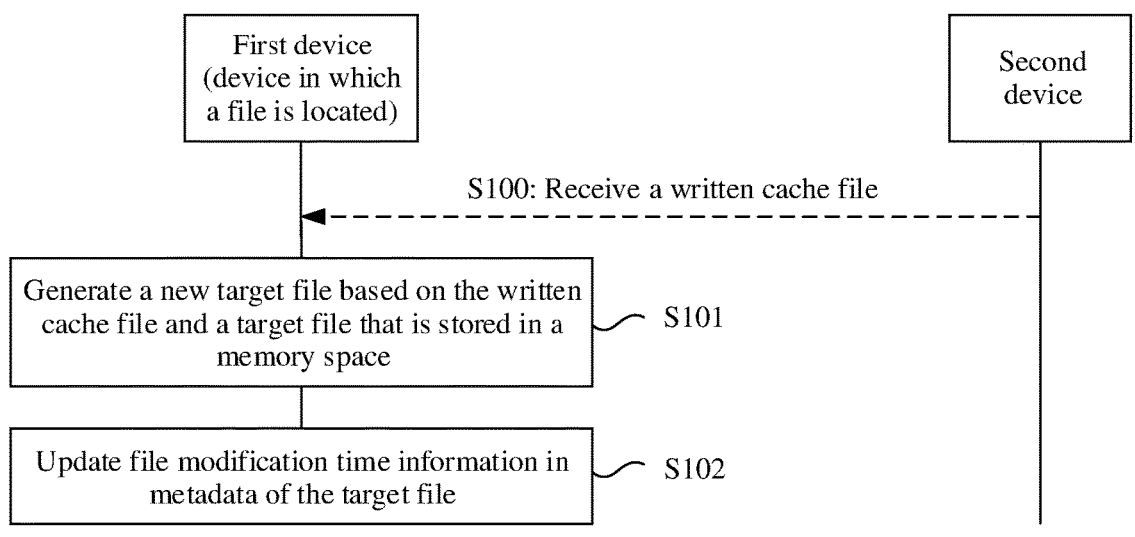
FIG. 11*a* is a schematic diagram of an example working procedure of generating a new target file by a first device according to an embodiment of this application.
Figure 11B:
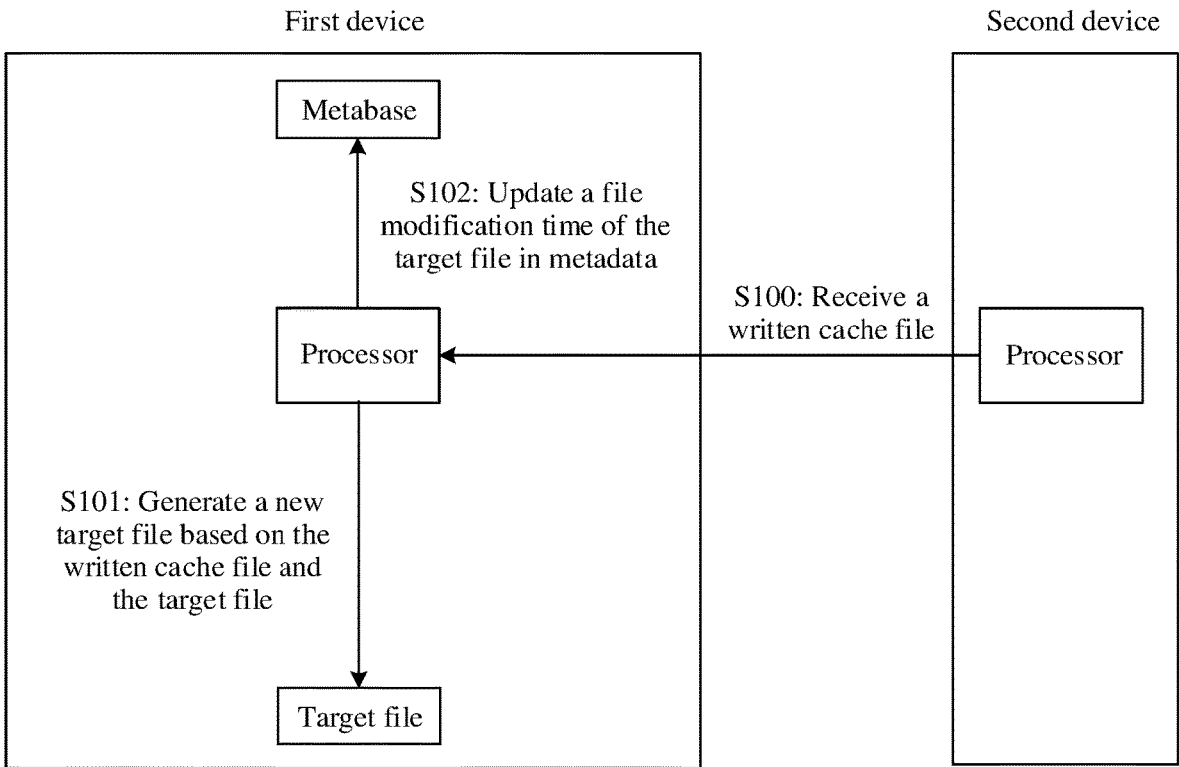
FIG. 11*b* is a schematic diagram of an example working procedure of generating a new target file by a first device according to an embodiment of this application.
Figure 12A:
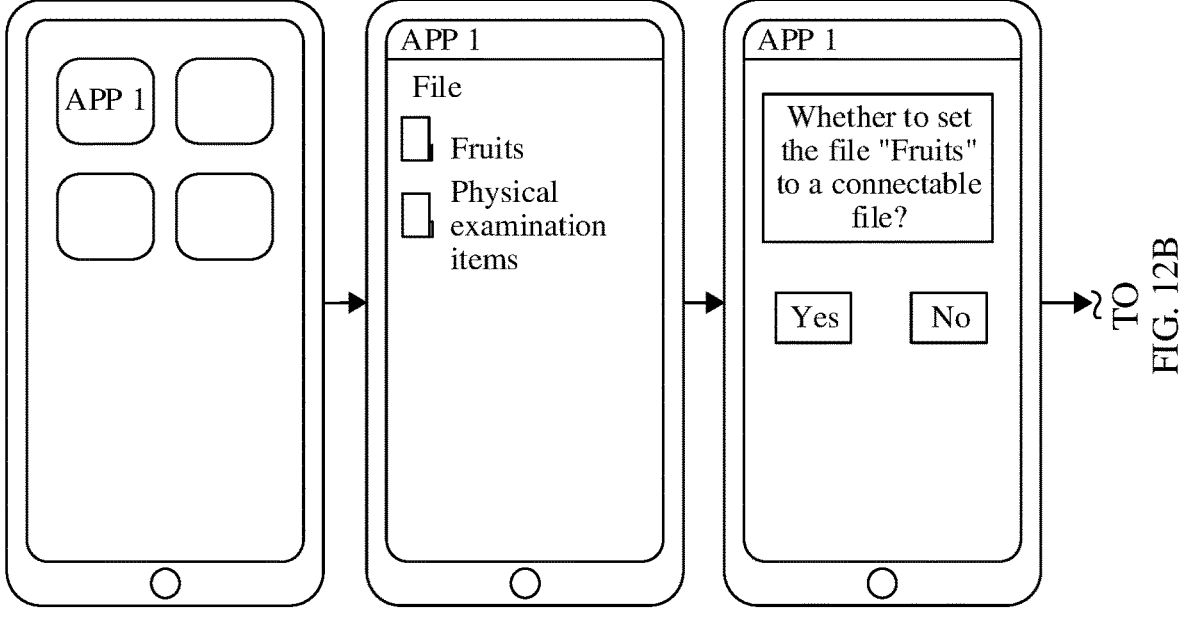
Figures 12A, 12B, 12C:
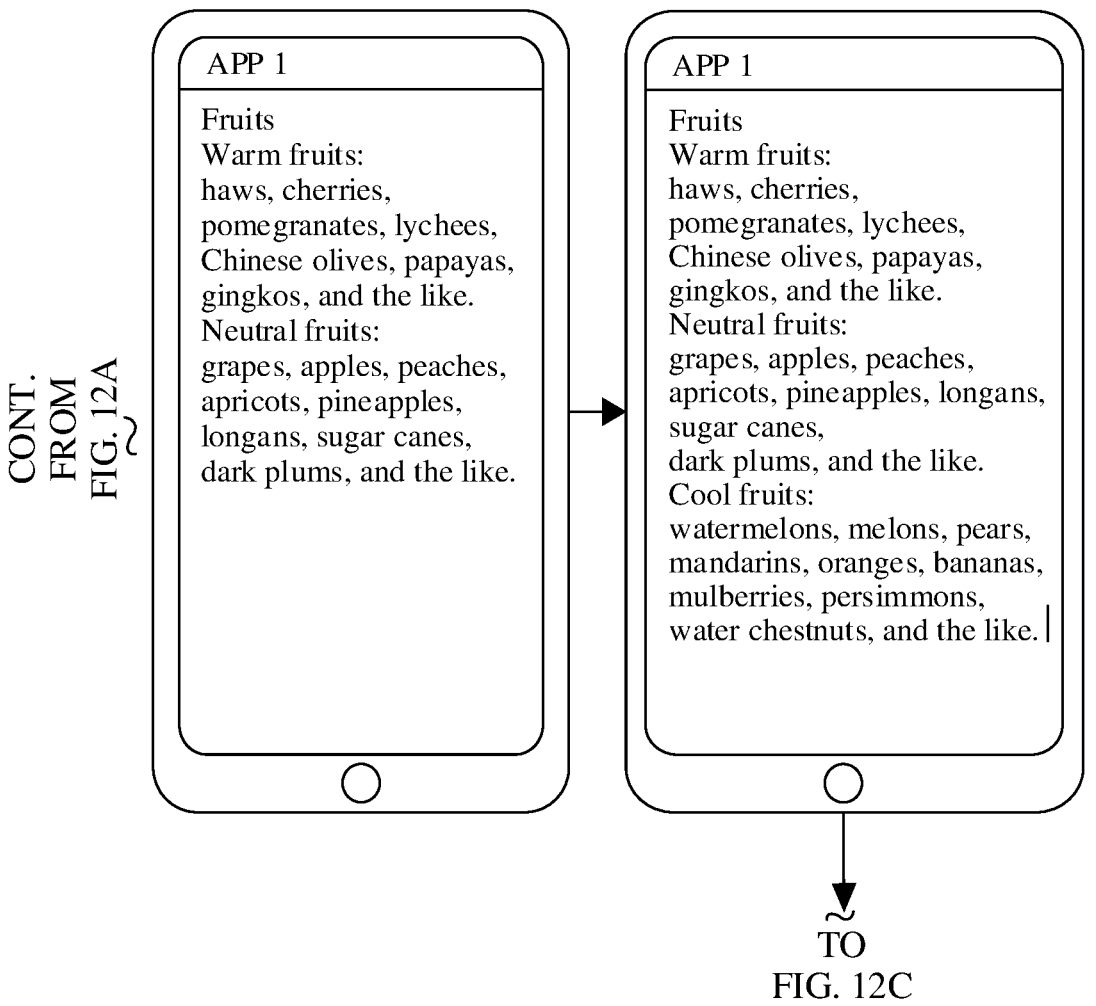

In a possible implementation, in the foregoing example application scenario, connected display of the target file is performed on a remote device (for example, the second device) other than the device in which the target file is located (the first device), and after the user performs editing on the second device, the second device sends the written cache file to the first device after receiving the storage operation of the user for the target file. After receiving the written cache file, the first device may generate a new target file based on the written cache file and the target file that is stored in the first device. FIG. 11a and FIG. 11b are schematic diagrams of an example working procedure of generating a new target file by a first device according to an embodiment of this application.

Based on FIG. 11a and FIG. 11b, in a possible implementation, the metadata of the target file further includes a file modification time of the target file. When the current device is the same as the device in which the file of the target file is located, in step S100, the current device receives the written cache file.

In step S101, the current device generates a new target file based on the written cache file and the target file that is stored in a memory.

In step S102, the current device updates file modification time information in the metadata of the target file.

In a possible implementation, a new target file is generated on the device in which the file is located, that is, file content of the target file is substantially changed, and a modification time of the file may be updated. The modification time information of the file may be associated with version information of the metabase, and a latest metabase in the metabases of the plurality of devices may be determined based on the modification time information of the file. Based on this, synchronous update of the target files stored in the devices may be implemented, and synchronous update of the metabases of the plurality of devices may be implemented.

FIG. 12A to FIG. 12D shows an example application scenario of interaction between a user and a device according to an embodiment of this application.

As shown in FIG. 12A to FIG. 12D, the user uses a first application (for example, an APP 1) on the first device (for example, a mobile phone) to view files "Fruits" and "Physical examination items" that can be opened, and taps "Yes" in a dialog box "whether to set the file 'Fruits' to a connectable file", to send an indication of adding a connection identifier to the file "Fruits". After receiving the indication of the user, a file system of the mobile phone detects that the file "Fruits" is stored in the mobile phone. In addition, when file metadata on the mobile phone does not include the connection identifier of the file "Fruits", the connection identifier of the file "Fruits" may be created, so that the file "Fruits" may be connected.

The user may tap the file "Fruits" seen on the APP 1, to send an indication for opening the file "Fruits". After determining that the user has a read/write permission for the file "Fruits", the file system may obtain file content of the file "Fruits" and display the file content on a display interface of the APP 1.

The user may edit the displayed file content on the display interface, for example, insert the following text after "dark plums, and the like.":

Cool fruits:

watermelons, melons, pears, mandarins, oranges, bananas, mulberries, persimmons, water chestnuts, and the like.

In this case, the last operation location of the user, that is, a cursor location, is after "water chestnuts, and the like.". Then, the user may use a second application (for example, an APP 2) on the second device (for example, a tablet computer) to view files "Fruits" and "Physical examination items" that can be opened. The user may tap the file "Fruits" seen on the APP 2, and send an indication for opening the file "Fruits". After determining that the user has a read/write permission for the file "Fruits", a file system of the second device may obtain file content of the file "Fruits" and display the file content on a display interface of the APP 2. In this case, the file content displayed on the display interface of the APP 2 is file content after the user performs a read/write operation on the APP 1 on the mobile phone; and the cursor location displayed on the display interface of the APP 2 is also the cursor location after the user performs the read/write operation on the APP 1 on the mobile phone. In this way, cross-device and cross-application file connection may be implemented based on a plurality of devices connected in a same local area network.

Figures 13, 14:
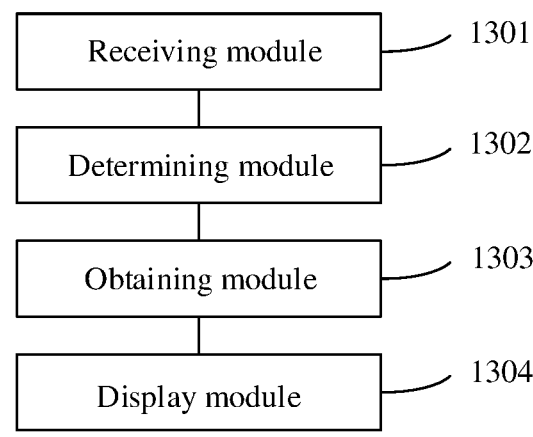
FIG. 13 is a diagram of a structure of a file connection apparatus according to an embodiment of this application.
FIG. 14 is an example schematic diagram of a structure of a terminal device according to an embodiment of this application.

FIG. 13 is a diagram of a structure of a file connection apparatus according to an embodiment of this application. The file connection apparatus is applied to the file system, and the file connection apparatus includes:

a receiving module 1301, configured to receive an indication that is by a user and that is for opening a target file;

a determining module 1302, configured to: in response to the indication for opening the target file, determine a device that accesses the target file last time, a device in which the file is located, and a connection record based on stored metadata of the target file, where the connection record indicates an operation location when the target file is stored last time;

an obtaining module 1303, configured to obtain file data of the target file from one or more terminal device that last accessed the target file and the device in which the file is located, where the file data includes a read cache file and a written cache file; and a display module 1304, configured to display to-be-displayed content based on at least one of the connection record of the target file and the file data of the target file.

In a possible implementation, when the current device, the device that accesses the target file last time, and the device in which the file is located are the same, the obtaining module includes a first obtaining submodule, configured to load the written cache file and the read cache file in a memory space; and the display module includes:

a first display submodule, configured to: when the written cache file is empty, determine an offset location of the to-be-displayed content relative to the target file based on the connection record, and display the to-be-displayed content based on the offset location and the read cache file in the memory space; and a second display submodule, configured to: when the written cache file is not empty, determine an offset location of the to-be-displayed content relative to the target file based on the written cache file, and display the to-be-displayed content based on the offset location and the read cache file and the written cache file in the memory space.

In a possible implementation, when the current device is the same as the device that accesses the target file last time, and is different from the device in which the file is located, the obtaining module includes a second obtaining submodule, configured to load the written cache file and the read cache file in a cache space; and the display module includes:

a third display submodule, configured to: when the written cache file is empty, determine an offset location of the to-be-displayed content relative to the target file based on the connection record, and display the to-be-displayed content based on the offset location and the read cache file in the cache space; and a fourth display submodule, configured to: when the written cache file is not empty, determine an offset location of the to-be-displayed content relative to the target file based on the written cache file, and display the to-be-displayed content based on the offset location and the read cache file and the written cache file in the cache space.

In a possible implementation, when the current device is the same as the device in which the file is located, and is different from the device that accesses the target file last time, the obtaining module includes:

a third obtaining submodule, configured to send a written cache file obtaining request to the device that accesses the target file last time;

a fourth obtaining submodule, configured to receive the returned written cache file; and a fifth obtaining submodule, configured to load the read cache file in a memory space; and the display module includes:

a fifth display submodule, configured to: when the written cache file is empty, determine an offset location of the to-be-displayed content relative to the target file based on the connection record, and display the to-be-displayed content based on the offset location and the read cache file in the memory space; and a sixth display submodule, configured to: when the written cache file is not empty, determine an offset location of the to-be-displayed content relative to the target file based on the written cache file, and display the to-be-displayed content based on the offset location and the read cache file and the written cache file in the memory space.

In a possible implementation, when the current device, the device that accesses the target file last time, and the device in which the file is located are all different from each other, the obtaining module includes:

a sixth obtaining submodule, configured to send a written cache file obtaining request to the device that accesses the target file last time;

a seventh obtaining submodule, configured to receive the returned written cache file;

an eighth obtaining submodule, configured to send a read cache file obtaining request to a device with a higher transmission speed in the device that accesses the target file last time and the device in which the file is located; and a ninth obtaining submodule, configured to receive the returned read cache file; and the display module includes:

a seventh display submodule, configured to: when the written cache file is empty, determine an offset location of the to-be-displayed content relative to the target file based on the connection record, and display the to-be-displayed content based on the offset location and the received read cache file; and an eighth display submodule, configured to: when the written cache file is not empty, determine an offset location of the to-be-displayed content relative to the target file based on the written cache file, and display the to-be-displayed content based on the offset location and the received read cache file and written cache file.

In a possible implementation, the determining module includes:

a first determining submodule, configured to send an instruction to the metabase of the current device, where the instruction includes a user identifier of the user and a file identifier of the target file, and the instruction is used to obtain the metadata that is of the target file and that is stored in the metabase of the current device;

a second determining submodule, configured to determine, based on the user identifier and the file identifier, whether the user has a read/write permission for the target file;

a third determining submodule, configured to trigger the metabases of the plurality of devices of the file system to perform synchronous update when it is determined that the user has the read/write permission for the target file; and a fourth determining submodule, configured to determine, based on updated metabases, the device that accesses the target file last time, the device in which the file is located, and the connection record.

In a possible implementation, when the current device is the same as the device in which the file of the target file is located, the apparatus further includes:

a first indication receiving module, configured to receive an indication that is of the user and that is for adding a connection identifier, where the indication for adding the connection identifier indicates that the connection identifier is added to the target file, and the connection identifier indicates that creation of the connection record of the target file is allowed in the metadata of the target file;

a first detection module, configured to detect whether the stored metadata of the target file includes the connection identifier of the target file;

an identifier adding module, configured to: when the metadata does not include the connection identifier of the target file, add, by the current device based on the indication for adding the connection identifier, the connection identifier of the target file to the metadata that is of the target file and that is stored in the current device; and a first update module, configured to trigger the metabases of the plurality of devices of the file system to perform synchronous update.

In a possible implementation, when the current device is the same as the device in which the file of the target file is located, the apparatus further includes:

a second indication receiving module, configured to receive an indication that is of the user and that is for creating a file, where the indication for creating the file indicates that the target file is created in the current device;

a file creation module, configured to: create the target file in the current device based on the indication for creating the file, and add a connection identifier of the target file to the metadata of the target file, where the connection identifier indicates that creation of the connection record of the target file is allowed in the metadata of the target file; and a second update module, configured to trigger the metabases of the plurality of devices of the file system to perform synchronous update.

In a possible implementation, the apparatus further includes:

a third indication receiving module, configured to receive an indication that is of the user and that is for deleting the connection identifier and/or the connection record of the target file;

a second detection module, configured to detect, by the current device, whether the stored metadata of the target file includes the connection identifier and/or the connection record of the target file;

a deletion module, configured to delete, by the current device based on the indication, the connection identifier and/or the connection record of the target file from the metadata when the metadata includes the connection identifier and/or the connection record of the target file; and a third update module, configured to trigger the metabases of the plurality of devices of the file system to perform synchronous update.

In a possible implementation, when the current device is different from the device in which the file of the target file is located, the apparatus further includes:

a fourth indication receiving module, configured to receive an indication that is of the user and that is for editing the target file;

an editing module, configured to perform, on a display interface of the current device, an editing operation on displayed content of the target file; and a first generation module, configured to generate the written cache file of the target file based on an operation location, an operation type, and operation content.

In a possible implementation, when the current device is different from the device in which the file of the target file is located, the apparatus further includes:

a fifth indication receiving module, configured to receive a storage indication of the user for the target file;

a sending module, configured to send, based on the indication, the written cache file to the device in which the file of the target file is located;

a record creation module, configured to: when there is no connection record of the target file in the metabase of the current device, create the connection record of the target file in the metabase of the current device based on the received storage indication of the user for the target file and the operation location in the target file; and a fourth update module, configured to: when there is the connection record of the target file in the metabase of the current device, update the connection record in the metabase of the current device based on the received storage indication of the user for the target file and the operation location in the target file.

In a possible implementation, the metadata of the target file further includes a file modification time of the target file, and when the current device is the same as the device in which the file of the target file is located, the apparatus further includes:

a file receiving module, configured to receive the written cache file;

a second generation module, configured to generate a new target file based on the written cache file and the target file that is stored in a memory; and a fifth update module, configured to update file modification time information in the metadata of the target file.

In a possible implementation, the apparatus further includes:

a sixth update module, configured to: when the to-be-displayed content of the target file is displayed, update the device that accesses the target file last time as the current device.

FIG. 14 is an example schematic diagram of a structure of a terminal device according to an embodiment of this application. With reference to FIG. 14, the terminal device 200 may be configured to perform the file connection method in the embodiment of FIG. 2 to FIG. 12D. With reference to FIG. 14, the terminal device 200 includes:

The terminal device 200 includes components such as a radio frequency (Radio Frequency, RF) circuit 110, a memory 120 including one or more computer-readable storage media, a receiving device 130, a display device 140, a sensor 150, an audio circuit 160, a wireless fidelity (Wireless Fidelity, Wi-Fi) module 170, a processor 180 including one or more processing cores, and a power supply 190. A person skilled in the art may understand that the terminal structure shown in FIG. 14 does not constitute any limitation on the terminal. The terminal may include more or fewer components than those shown in the figure, or some components may be combined, or a different component deployment may be used.

The RF circuit 110 may be configured to receive and send a signal in an information receiving and sending process or a call process, and may complete work of the obtaining module in this application. Particularly, after downlink information of a base station is received, the downlink information is handed over to one or more processors 180 for processing, and in addition, related uplink data is sent to the base station. Usually, the RF circuit 110 includes but is not limited to an antenna, at least one amplifier, a tuner, one or more oscillators, a subscriber identity module (SIM) card, a transceiver, a coupler, a low noise amplifier (Low Noise Amplifier, LNA), a duplexer, and the like. In addition, the RF circuit 110 may further communicate with a network and another device through wireless communication. The wireless communication may use any communication standard or protocol, including but not limited to: global system for mobile communications (Global System of Mobile Communication, GSM), a general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, a short messaging service (Short Messaging Service, SMS), and the like.

The memory 120 may be configured to store software programs and modules in embodiments of this application. The processor 180 executes various functional applications and data processing by running the software programs and the modules stored in the memory 120. The memory 120 may mainly include a program storage area and a data storage area. The program storage area may store an operating system, an application required by at least one function (such as a sound play function, an image play function, and a text display function), and the like. The data storage area may store data (such as audio data, video data, and a document) created based on use of the terminal device 200, the foregoing metadata, and the like. In addition, the memory 120 may include a high-speed random access memory, and may further include a non-volatile memory such as at least one magnetic disk storage device, a flash memory, or another volatile solid-state storage device. Correspondingly, the memory 120 may further include a memory controller, to provide access by the processor 180 and the receiving device 130 to the memory 120.

The receiving device 130 may be configured to: receive input numeric or character information, and generate keyboard, mouse, joystick, optical, or trackball signal inputs related to user settings and function control, to complete a function of receiving an indication by a user. Specifically, the receiving device 130 may include a touch-sensitive surface 131 and another input device 132. The touch-sensitive surface 131, also referred to as a touch display screen or a touch panel, may collect a touch operation by a user on or near the touch-sensitive surface (such as an operation of the user on or near the touch-sensitive surface 131 by using any suitable object or attachment, such as a finger or a stylus), and drive a corresponding connection apparatus according to a preset program. Optionally, the touch-sensitive surface 131 may include two parts: a touch detection apparatus and a touch controller. The touch detection apparatus detects a touch location of the user, detects a signal brought by the touch operation, and transmits the signal to the touch controller. The touch controller receives touch information from the touch detection apparatus, converts the touch information into contact coordinates, sends the contact coordinates to the processor 180, and receives and executes a command sent by the processor 180. In addition, the touch-sensitive surface 131 may be a resistive, capacitive, infrared, or surface sound wave type touch-sensitive surface. In addition to the touch-sensitive surface 131, the receiving device 130 may further include the another input device 132. Specifically, the another input device 132 may include but is not limited to one or more of a physical keyboard, a function key (such as a volume control key or a power key), a trackball, a mouse, a joystick, and the like.

The display device 140 may be configured to display information input by the user or information provided to the user, and various graphical user interfaces of the terminal device 200, and the graphical user interfaces may include a graphic, a text, an icon, a video, and any combination thereof. The display device 140 may include a display panel 141. Optionally, the display panel 141 may be configured in a form of a liquid crystal display (Liquid Crystal Display, LCD), an organic light-emitting diode (Organic Light-Emitting Diode, OLED), or the like. Further, the touch-sensitive surface 131 may cover the display panel 141. After detecting the touch operation on or near the touch-sensitive surface 131, the touch-sensitive surface 131 transmits the touch operation to the processor 180, to determine a type of the touch event. Then, the processor 180 provides a corresponding visual output on the display panel 141 based on the type of the touch event. Although, in FIG. 14, the touch-sensitive surface 131 and the display panel 141 are used as two independent components to implement input and output functions, in some embodiments, the touch-sensitive surface 131 and the display panel 141 may be integrated to implement the input and output functions.

The terminal device 200 may further include at least one sensor 150, such as an optical sensor, a motion sensor, or another sensor. Specifically, the optical sensor may include an ambient light sensor and a proximity sensor. The ambient light sensor may adjust luminance of the display panel 141 based on brightness of ambient light. The proximity sensor may turn off the display panel 141 and/or backlight when the terminal device 200 moves to the ear. As a motion sensor, a gravity acceleration sensor may detect a magnitude of acceleration in each direction (generally, three axes), may detect a magnitude and a direction of gravity in a static mode, and may be used for an application that identifies a mobile phone posture (such as landscape-portrait switching, related games, and magnetometer posture calibration), a function related to vibration identification (such as a pedometer and a knock), and the like. The terminal device 200 may further be provided with a gyroscope, a barometer, a hygrometer, a thermometer, an infrared sensor, and other sensors. Details are not described herein.

The audio circuit 160, a speaker 161, and a microphone 162 may provide an audio interface between the user and the terminal device 200. The audio circuit 160 may convert received audio data into an electrical signal and transmit the electrical signal to the speaker 161. The speaker 161 converts the electrical signal into a sound signal for output. In addition, the microphone 162 converts a collected sound signal into an electrical signal. The audio circuit 160 receives the electrical signal and converts the electrical signal into audio data, and then outputs the audio data to the processor 180 for processing. Next, the audio data is sent to, for example, another terminal by using the RF circuit 110, or is output to the memory 120 for further processing. The audio circuit 160 may further probably include an earplug jack, to provide communication between an external earphone and the terminal device 200.

Wi-Fi is a short-range wireless transmission technology. The terminal device 200 may help, by using the Wi-Fi module, the user to receive and send an email, browse a web page, access streaming media, and the like. The Wi-Fi module provides wireless broadband Internet access for the user. When a plurality of terminal devices are connected to same Wi-Fi, data transmission may be performed between the plurality of terminal devices by using the Wi-Fi module 170. Although the Wi-Fi module 170 is shown in FIG. 14, it may be understood that the Wi-Fi module 170 is not a mandatory component of the terminal device 200, and may be omitted by all means based on a requirement without changing essence of the present invention.

The processor 180 is a control center of the terminal device 200, and is connected to various parts of the entire terminal device by using various interfaces and lines. The processor 180 performs various functions and data processing of the terminal device 200 by running or executing software programs and/or modules stored in the memory 120 and by invoking data stored in the memory 120, to perform overall monitoring on the terminal device. Optionally, the processor 180 may include one or more processing cores. Optionally, the processor 180 may integrate an application processor and a modem processor. The application processor mainly processes an operating system, a user interface, an application, and the like. The modem processor mainly processes wireless communication. It may be understood that the modem processor may alternatively not be integrated into the processor 180.

The terminal device 200 further includes the power supply 190 (for example, a battery) that supplies power to each component. Optionally, the power supply may be logically connected to the processor 180 by using a power management system, to implement functions such as charging, discharging, and power consumption management by using the power management system. The power supply 190 may further include one or more direct current or alternating current power supplies, a recharging system, a power supply fault detection circuit, a power supply converter or an inverter, a power supply state indicator, and any other component.

Although not shown, the terminal device 200 may further include a camera, a Bluetooth module, and the like, and details are not described herein. Specifically, in this embodiment, the display device of the terminal is a touchscreen display, and the terminal further includes a memory and one or more programs. The one or more programs are stored in the memory and are executed by one or more processors after being configured. The one or more programs are used to perform the method in the embodiments of FIG. 2 to FIG. 12D in this application.

An embodiment of this application provides an electronic apparatus, including a processor and a memory that is configured to store instructions that can be executed by the processor. The processor is configured to implement the foregoing method when executing the instructions.

An embodiment of this application provides a non-volatile computer-readable storage medium, storing computer program instructions. When the computer program instructions are executed by a processor, the foregoing method is implemented.

An embodiment of this application provides a computer program product, including computer-readable code or a non-volatile computer-readable storage medium carrying computer-readable code. When the computer-readable code is run in an electronic device, a processor in the electronic device performs the foregoing method.

For example descriptions of the foregoing embodiments, refer to the foregoing descriptions of FIG. 1 to FIG. 14. Details are not described herein again.

The computer-readable storage medium may be a tangible device that may retain and store instructions for use by an instruction execution device. The computer-readable storage medium may be, for example, but is not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (Random Access Memory, RAM), a read only memory (Read Only Memory, ROM), an erasable programmable read-only-memory (Electrically Programmable Read-Only-Memory, EPROM, or flash memory), a static random-access memory (Static Random-Access Memory, SRAM), a portable compact disc read-only memory (Compact Disc Read-Only Memory, CD-ROM), a digital video disc (Digital Video Disc, DVD), a memory stick, a floppy disk, a mechanical coding device, for example, a punch card or a convex structure in a groove that stores instructions, and any suitable combination thereof.

The computer-readable program instructions or code described herein may be downloaded from the computer-readable storage medium to each computing/processing device or to an external computer or external storage device by using a network such as the Internet, a local area network, a wide area network, and/or a wireless network. The network may include a copper transmission cable, optical fiber transmission, wireless transmission, a router, a firewall, a switch, a gateway computer and/or an edge server. A network adapter card or a network interface in each computing/processing device receives the computer-readable program instructions from the network, and forwards the computer-readable program instructions for storage into the computer-readable storage medium in each computing/processing device.

The computer program instruction used to perform an operation in this application may be an assembly instruction, an instruction set architecture (Instruction Set Architecture, ISA) instruction, a machine instruction, a machine-related instruction, microcode, a firmware instruction, status setting data, or source code or target code written in any combination of one or more programming languages. The programming languages include an object-oriented programming language such as Smalltalk or C++, and a conventional procedural programming language such as a "C" language or a similar programming language. The program-readable program instructions may be executed completely on the user computer, partially on the user computer, as an independent software package, partially on the user computer, partially on the remote computer, or completely on the remote computer or server. In a case involving a remote computer, the remote computer may be connected to the user computer by using any type of network, including a local area network (Local Area Network, LAN) or a wide area network (Wide Area Network, WAN), or may be connected to an external computer (for example, using an Internet service provider to connect via the Internet). In some embodiments, an electronic circuit, for example, a programmable logic circuit, a field-programmable gate array (Field-Programmable Gate Array, FPGA), or a programmable logic array (Programmable Logic Array, PLA), is customized by using status information of the computer-readable program instructions. The electronic circuit may execute the computer-readable program instructions, to implement various aspects of this application.

The various aspects of this application are described herein with reference to the flowcharts and/or block diagrams of the method, the apparatus (system), and the computer program product according to embodiments of this application. It should be understood that each block of the flowcharts and/or block diagrams and a combination of blocks in the flowcharts and/or block diagrams may be implemented by the computer-readable program instructions.

These computer-readable program instructions may be provided to a processor of a general-purpose computer, a special-purpose computer, or another programmable data processing apparatus to produce a machine, so that when the instructions are executed by the processor of the computer or the another programmable data processing apparatus, an apparatus for implementing functions/acts specified in one or more blocks in the flowcharts and/or block diagrams is generated. These computer-readable program instructions may alternatively be stored in the computer-readable storage medium. These instructions enable the computer, the programmable data processing apparatus, and/or another device to work in a specific manner. Therefore, the computer-readable medium storing the instructions includes an artifact that includes instructions for implementing the various aspects of the functions/actions specified in the one or more blocks in the flowcharts and/or the block diagrams.

The computer-readable program instructions may alternatively be loaded onto the computer, the another programmable data processing apparatus, or the another device, so that a series of operation steps is performed on the computer, the another programmable data processing apparatus, or the another device to produce a computer-implemented process. Therefore, the instructions executed on the computer, the another programmable data processing apparatus, or the another device implements the functions/actions specified in the one or more blocks in the flowcharts and/or block diagrams.

The flowcharts and block diagrams in the accompanying drawings show the system architectures, functions, and operations that may be implemented by apparatuses, systems, methods, and computer program products according to various embodiments of this application. In this regard, each block in the flowcharts or block diagrams may represent a module, a program segment, or a part of an instruction, and the module, the program segment, or the part of the instruction includes one or more executable instructions for implementing a specified logical function. In some alternative implementations, functions marked in the blocks may also occur in a sequence different from that marked in the accompanying drawings. For example, two consecutive blocks may be actually executed substantially in parallel, or sometimes may be executed in a reverse order, depending on a function involved.

It should also be noted that each block in the block diagrams and/or the flowcharts, and a combination of blocks in the block diagrams and/or the flowcharts may be implemented by hardware (for example, a circuit or an ASIC (Application Specific Integrated Circuit, application specific integrated circuit)) that performs a corresponding function or action, or may be implemented by a combination of hardware and software, for example, firmware.

Although the present invention is described herein with reference to the embodiments, in a process of implementing the present invention that seeks protection, a person skilled in the art may understand and implement other variations of the disclosed embodiments by viewing the accompanying drawings, disclosed content, and the appended claims. In the claims, the word "comprising" (comprising) does not exclude another component or another step, and "a" or "one" does not exclude a case of a plurality of objects. A single processor or another unit may implement several functions enumerated in the claims. Some measures are recorded in dependent claims that are different from each other, but this does not mean that these measures cannot be combined to produce a good effect.

The foregoing has described the embodiments of this application. The foregoing descriptions are examples, are not exhaustive, and are not limited to the disclosed embodiments. Many modifications and variations are apparent to a person of ordinary skill in the art without departing from the scope and spirit of the described embodiments. Selection of terms used in this specification is intended to best explain the principles of the embodiments, actual application, or improvements to technologies in the market, or to enable another person of ordinary skill in the art to understand the embodiments disclosed in this specification.

What is claimed is:

1. A file connection method applied to a file system comprising a plurality of terminal devices, metadata of a target file being separately stored in metabases of each of the plurality of terminal devices, the method comprising:

receiving, by a current device, an indication that is by a user and that is for opening the target file;

determining, by the current device based on the stored metadata of the target file, a device that last accessed the target file, a device in which the file is located, and a connection record of the target file, wherein the connection record indicates an operation location when the target file was last stored;

obtaining, by the current device, file data of the target file from at least one of the terminal device that last accessed the target file and the device in which the file is located, wherein the file data comprises a read cache file and a write cache file;

displaying, by the current device, to-be-displayed content based on at least one of the connection record of the target file and the file data of the target file;

receiving, by the current device, an indication of the user and for deleting the connection identifier and/or the connection record of the target file;

detecting, by the current device, whether the stored metadata of the target file comprises the connection identifier and/or the connection record of the target file and in response to determining the metadata comprises the connection identifier and/or the connection record of the target file, deleting, by the current device based on the indication, the connection identifier and/or the connection record of the target file from the metadata; and triggering, by the current device, the metabases of the plurality of devices of the file system to perform synchronous update.

2. The file connection method according to claim 1, wherein in response to determining the current device, the device that last accessed the target file, and the device in which the file is located are the same, the obtaining, by the current device, file data of the target file from at least one of the terminal device that last accessed the target file and the device in which the file is located comprises:

loading, by the current device, the write cache file and the read cache file in a memory space; and the displaying, by the current device, to-be-displayed content based on at least one of the connection record of the target file and the file data of the target file comprises:

in response to determining the write cache file is empty, determining, by the current device, an offset location of the to-be-displayed content relative to the target file based on the connection record, and displaying the to-be-displayed content based on the offset location and the read cache file in the memory space; or in response to determining the write cache file is not empty, determining, by the current device, an offset location of the to-be-displayed content relative to the target file based on the write cache file, and displaying the to-be-displayed content based on the offset location and the read cache file and the write cache file in the memory space.

3. The file connection method according to claim 1, wherein in response to determining the current device is the same as the device that last accessed the target file and is different from the device in which the file is located, the obtaining, by the current device, file data of the target file from at least one of the terminal device that last accessed the target file and the device in which the file is located comprises:

loading, by the current device, the write cache file and the read cache file in a cache space; and the displaying, by the current device, to-be-displayed content based on at least one of the connection record of the target file and the file data of the target file comprises:

in response to determining the write cache file is empty, determining, by the current device, an offset location of the to-be-displayed content relative to the target file based on the connection record, and displaying the to-be-displayed content based on the offset location and the read cache file in the cache space; or in response to determining the write cache file is not empty, determining, by the current device, an offset location of the to-be-displayed content relative to the target file based on the write cache file, and displaying the to-be-displayed content based on the offset location and the read cache file and the write cache file in the cache space.

4. The file connection method according to claim 1, wherein in response to determining the current device is the same as the device in which the file is located and is different from the device that last accessed the target file, the obtaining, by the current device, file data of the target file from at least one of the terminal device that last accessed the target file and the device in which the file is located comprises:

sending, by the current device, a write cache file obtaining request to the device that last accessed the target file;

receiving, by the current device, the returned write cache file; and loading, by the current device, the read cache file in a memory space; and the displaying, by the current device, to-be-displayed content based on at least one of the connection record of the target file and the file data of the target file comprises:

in response to determining the write cache file is empty, determining, by the current device, an offset location of the to-be-displayed content relative to the target file based on the connection record and displaying the to-be-displayed content based on the offset location and the read cache file in the memory space; or in response to determining the write cache file is not empty, determining, by the current device, an offset location of the to-be-displayed content relative to the target file based on the write cache file and displaying the to-be-displayed content based on the offset location and the read cache file and the write cache file in the memory space.

5. The file connection method according to claim 1, wherein in response to determining the current device that last accessed the target file and the device in which the file is located are different from each other, the obtaining, by the current device, file data of the target file from at least one of the terminal device that last accessed the target file and the device in which the file is located comprises:

sending, by the current device, a write cache file obtaining request to the device that last accessed the target file;

receiving, by the current device, the returned write cache file;

sending, by the current device, a read cache file obtaining request to a device with a higher transmission speed in the device that last accessed the target file and the device in which the file is located; and receiving, by the current device, the returned read cache file; and the displaying, by the current device, to-be-displayed content based on at least one of the connection record of the target file and the file data of the target file comprises:

in response to determining the write cache file is empty, determining, by the current device, an offset location of the to-be-displayed content relative to the target file based on the connection record and displaying the to-be-displayed content based on the offset location and the received read cache file; or in response to determining the write cache file is not empty, determining, by the current device, an offset location of the to-be-displayed content relative to the target file based on the write cache file and displaying the to-be-displayed content based on the offset location and the received read cache file and write cache file.

6. The file connection method according to claim 1, wherein the determining, by the current device based on the stored metadata of the target file, a device that accesses the target file last time, a device in which the file is located, and a connection record comprises:

sending, by the current device, an instruction to the metabase of the current device, wherein the instruction comprises a user identifier of the user and a file identifier of the target file to obtain the metadata of the target file and that is stored in the metabase of the current device;

determining, by the metabase of the current device based on the user identifier and the file identifier, whether the user has a read/write permission for the target file and triggering, by the current device, the metabases of the plurality of devices of the file system to perform a synchronous update in response to determining that the user has the read/write permission for the target file; and determining, by the current device based on updated metabases, the device that last accessed the target file, the device in which the file is located, and the connection record.

7. The file connection method according to claim 1, wherein in response to determining the current device is the same as the device in which the target file is located, the method further comprises:

receiving, by the current device, an indication of the user and for adding a connection identifier, wherein the indication for adding the connection identifier indicates that the connection identifier has been added to the target file and the connection identifier indicates that creation of the connection record of the target file is allowed in the metadata of the target file;

detecting, by the current device, whether the stored metadata of the target file comprises the connection identifier of the target file;

in response to determining the metadata does not comprise the connection identifier of the target file, adding, by the current device based on the indication for adding the connection identifier, the connection identifier of the target file to the metadata that is of the target file and that is stored in the current device; and triggering, by the current device, the metabases of the plurality of devices of the file system to perform synchronous update.

8. The file connection method according to claim 1, wherein in response to determining the current device is the same as the device in which the target file is located, the method further comprises:

receiving, by the current device, an indication of the user and for creating a file, wherein the indication for creating the file indicates that the target file has been created in the current device;

creating, by the current device, the target file in the current device based on the indication for creating the file and adding a connection identifier of the target file to the metadata of the target file, wherein the connection identifier indicates that creation of the connection record of the target file is allowed in the metadata of the target file; and triggering, by the current device, the metabases of the plurality of devices of the file system to perform synchronous update.

9. The file connection method according to claim 1, wherein in response to determining the current device is different from the device in which the target file is located, the method further comprising:

receiving, by the current device, an indication of the user and that is for editing the target file;

performing, by the current device on a display interface of the current device based on the indication, an editing operation on displayed content of the target file; and generating, by the current device, the write cache file of the target file based on an operation location, an operation type, and operation content.

10. The file connection method according to claim 1, wherein in response to determining the current device is different from the device in which the target file is located, the method further comprising:

receiving, by the current device, a storage indication of the user for the target file;

sending, by the current device based on the storage indication, the write cache file to the device in which the target file is located;

in response to determining there is no connection record of the target file in the metabase of the current device, creating the connection record of the target file in the metabase of the current device based on the received storage indication of the user for the target file and the operation location in the target file; or in response to determining there is the connection record of the target file in the metabase of the current device, updating the connection record in the metabase of the current device based on the received storage indication of the user for the target file and the operation location in the target file.

11. The file connection method according to claim 1, wherein the metadata of the target file further comprises a file modification time of the target file, and in response to determining the current device is the same as the device in which the target file is located, the method further comprises:

receiving, by the current device, the write cache file;

generating, by the current device, a new target file based on the write cache file and the target file that is stored in a memory; and updating, by the current device, file modification time information in the metadata of the target file.

12. The file connection method according to claim 1, further comprising:

in response to determining that the to-be-displayed content of the target file is displayed, updating the device that last accessed the target file as the current device.

13. A terminal device, comprising:

a processor; and a memory configured to store instructions that, when executed by the processor, causes the terminal device to:

receive an indication by a user and that is for opening the target file;

in response to the indication for opening the target file, determine based on the stored metadata of the target file, a device that last accessed the target file, a device in which the file is located, and a connection record, wherein the connection record indicates an operation location where the target file was last stored;

obtain file data of the target file from at least one of the terminal device that last accessed the target file and the device in which the file is located, wherein the file data comprises a read cache file and a write cache file;

display to-be-displayed content based on at least one of the connection record of the target file and the file data of the target file;

receive, by the current device, an indication of the user and for deleting the connection identifier and/or the connection record of the target file;

detect, by the current device, whether the stored metadata of the target file comprises the connection identifier and/or the connection record of the target file and in response to determining the metadata comprises the connection identifier and/or the connection record of the target file, deleting, by the current device based on the indication, the connection identifier and/or the connection record of the target file from the metadata; and trigger, by the current device, the metabases of the plurality of devices of the file system to perform synchronous update.

14. The terminal device according to claim 13, wherein in response to determining that the terminal device, the device that last accessed the target file, and the device in which the file is located are the same, the terminal device is further configured to:

load the write cache file and the read cache file in a memory space; and in response to determining that the write cache file is empty, determine an offset location of the to-be-displayed content relative to the target file based on the connection record, and display the to-be-displayed content based on the offset location and the read cache file in the memory space; or in response to determining that the write cache file is not empty, determine an offset location of the to-be-displayed content relative to the target file based on the write cache file and display the to-be-displayed content based on the offset location and the read cache file and the write cache file in the memory space.

15. The terminal device according to claim 13, wherein in response to determining that the terminal device is the same as the device that last accessed the target file, and is different from the device in which the file is located, the terminal device is further configured to:

load the write cache file and the read cache file in a cache space; and in response to determining that the write cache file is empty, determine an offset location of the to-be-displayed content relative to the target file based on the connection record, and display the to-be-displayed content based on the offset location and the read cache file in the cache space; or in response to determining that the write cache file is not empty, determine an offset location of the to-be-displayed content relative to the target file based on the write cache file and display the to-be-displayed content based on the offset location and the read cache file and the write cache file in the cache space.

16. The terminal device according to claim 13, wherein in response to determining that the terminal device is the same as the device in which the file is located, and is different from the device that last accessed the target file, the terminal device is further configured to:

send a write cache file obtaining request to the device that last accessed the target file;

receive the returned write cache file; and load the read cache file in a memory space; and in response to determining that the write cache file is empty, determine an offset location of the to-be-displayed content relative to the target file based on the connection record, and display the to-be-displayed content based on the offset location and the read cache file in the memory space; or in response to determining that the write cache file is not empty, determine an offset location of the to-be-displayed content relative to the target file based on the write cache file, and display the to-be-displayed content based on the offset location and the read cache file and the write cache file in the memory space.

17. The terminal device according to claim 13, wherein in response to determining that the terminal device, the device that last accessed the target file, and the device in which the file is located are all different from each other, the terminal device is further configured to:

send a write cache file obtaining request to the device that last accessed the target file;

receive the returned write cache file;

send a read cache file obtaining request to a device with a higher transmission speed in the device that accesses the target file last time and the device in which the file is located; and receive the returned read cache file; and in response to determining that the write cache file is empty, determine an offset location of the to-be-displayed content relative to the target file based on the connection record, and display the to-be-displayed content based on the offset location and the received read cache file; or in response to determining that the write cache file is not empty, determine an offset location of the to-be-displayed content relative to the target file based on the write cache file, and display the to-be-displayed content based on the offset location and the received read cache file and write cache file.

18. The terminal device according to claim 13, wherein the terminal device is further configured to:

send an instruction to the metabase of the terminal device, wherein the instruction comprises a user identifier of the user and a file identifier of the target file to obtain the metadata of the target file and that is stored in the metabase of the terminal device;

determine, based on the user identifier and the file identifier, whether the user has a read/write permission for the target file;

trigger the metabases of the plurality of devices of the file system to perform synchronous update in response to determining that the user has the read/write permission for the target file; and determine, based on updated metabases, the device that last accessed the target file, the device in which the file is located, and the connection record.

19. A non-volatile computer-readable storage medium storing computer program instructions that, when executed by a processor, cause a terminal device to:

receive an indication by a user and that is for opening the target file;

in response to the indication for opening the target file, determine based on the stored metadata of the target file, a device that last accessed the target file, a device in which the file is located, and a connection record, wherein the connection record indicates an operation location where the target file was last stored;

obtain file data of the target file from at least one of the terminal device that last accessed the target file and the device in which the file is located, wherein the file data comprises a read cache file and a write cache file;

display to-be-displayed content based on at least one of the connection records of the target file and the file data of the target file;

receive, by the current device, an indication of the user and for deleting the connection identifier and/or the connection record of the target file;

detect, by the current device, whether the stored metadata of the target file comprises the connection identifier and/or the connection record of the target file and in response to determining the metadata comprises the connection identifier and/or the connection record of the target file, deleting, by the current device based on the indication, the connection identifier and/or the connection record of the target file from the metadata; and trigger, by the current device, the metabases of the plurality of devices of the file system to perform synchronous update.

* * * * *